United States Patent [19]
Li

[11] Patent Number: 5,866,964
[45] Date of Patent: Feb. 2, 1999

[54] RELUCTANCE MACHINE WITH AUXILIARY FIELD EXCITATIONS

[75] Inventor: Yue Li, St. Louis, Mo.

[73] Assignee: Emerson Electric Company, St. Louis, Mo.

[21] Appl. No.: 754,096

[22] Filed: Nov. 20, 1996

Related U.S. Application Data

[63] Continuation-in-part of Ser. No. 593,752, Jan. 29, 1996.

[51] Int. Cl.⁶ .......................... H02K 21/00; H02K 21/04
[52] U.S. Cl. .......................... 310/198; 310/162; 310/166; 310/168; 310/180; 310/200; 310/184; 318/701
[58] Field of Search .................... 310/180, 190, 310/162, 166, 168, 165, 184, 185, 198, 200; 318/701, 439, 138

[56] References Cited

U.S. PATENT DOCUMENTS

| | | | |
|---|---|---|---|
| Re. 28,705 | 2/1976 | Hoffmeyer | 310/180 |
| 2,854,596 | 9/1958 | Weixelman et al. | 310/198 |
| 3,041,486 | 6/1962 | Moffitt | 310/168 |
| 3,204,167 | 8/1965 | Zigler | 318/225 |
| 3,518,473 | 6/1970 | Nordebo | 310/168 |
| 3,564,312 | 2/1971 | Bunea | 310/168 |
| 3,593,051 | 7/1971 | Akbar | 310/166 |
| 3,612,988 | 10/1971 | Wanlass | 323/43.5 R |
| 3,648,206 | 3/1972 | Wanlass | 336/160 |
| 3,678,352 | 7/1972 | Bedford | 318/138 |
| 3,679,962 | 7/1972 | Wanlass | 312/18 |
| 3,679,966 | 7/1972 | Wanlass | 323/56 |
| 3,704,402 | 11/1972 | Leitgeb | 318/166 |
| 3,732,448 | 5/1973 | Schiethart | 310/162 |
| 3,758,800 | 9/1973 | McLaughlin | 310/211 |
| 3,881,146 | 4/1975 | Wanlass | 321/2 |
| 3,956,678 | 5/1976 | Byrne et al. | 318/138 |
| 3,995,203 | 11/1976 | Török | 310/163 |
| 4,063,135 | 12/1977 | Wanlass | 318/220 |
| 4,095,149 | 6/1978 | Wanlass | 318/220 |

(List continued on next page.)

FOREIGN PATENT DOCUMENTS

| | | | |
|---|---|---|---|
| 0573198A1 | 5/1993 | European Pat. Off. | H02P 61/02 |
| 3003699 | 1/1991 | Japan | H02P 8/00 |
| 4281390 | 10/1992 | Japan | H02P 7/00 |
| 6-335271 | 5/1993 | Japan | H02K 19/12 |
| 5-292716 | 11/1993 | Japan | H02K 19/12 |
| 2159672 | 12/1985 | United Kingdom . | |
| 2167914 | 6/1986 | United Kingdom . | |
| 2275836 | 7/1994 | United Kingdom . | |

OTHER PUBLICATIONS

Li, et al., "A Doubly Salient Permanent Magnet Motor Capable of Field Weakening," U. of Wisconsin–Madison, Dept. of Electrical and Computer Eng. (1995).

Llang, et al., "A New Variable Reluctance Motor Utilizing An Auxiliary Commutation Winding," pp. 423–432, IEEE Transactions on Industry Applications, Vol. 30 No. 2, Mar./Apr. 1994.

Stephenson and Blake, "The Characteristics, Design and Applications of Switched Reluctance Motors and Drives," PCIM Conference & Exhibition, Jun. 21–24, 1993, Nuremberg, Germany.

Li, et al., "A Doubly Salient Doubly Excited Variable Reluctance Motor," pp. 137–143, U. of Wisconsin–Madison, Dept. of Electrical and Computer Eng. (1993).

(List continued on next page.)

Primary Examiner—Steven L. Stephan
Assistant Examiner—B. Mullins
Attorney, Agent, or Firm—Arnold, White & Durkee

[57] ABSTRACT

A reluctance machine system including a reluctance machine having a rotor and a stator including at least one phase winding and a full pitch auxiliary filed winding where constant currents are established in the auxiliary field winding to assist in the establishment of a magnetic field in the machine so as to improve the machine's performance. Alternate embodiments are disclosed wherein the auxiliary field winding is positioned in a conventionally-shaped stator with phase windings of different types (e.g., short-pitched and fractional-pitched).

17 Claims, 17 Drawing Sheets

U.S. PATENT DOCUMENTS

| | | |
|---|---|---|
| 4,132,932 | 1/1979 | Wanlass .................................. 318/795 |
| 4,134,055 | 1/1979 | Akamatsu ............................... 318/696 |
| 4,152,630 | 5/1979 | Wanlass .................................. 318/796 |
| 4,187,457 | 2/1980 | Wanlass .................................. 318/729 |
| 4,228,387 | 10/1980 | Brown .................................... 318/696 |
| 4,321,518 | 3/1982 | Akamatsu ............................... 318/696 |
| 4,338,557 | 7/1982 | Wanlass .................................. 318/729 |
| 4,348,605 | 9/1982 | Török .................................... 310/168 |
| 4,348,619 | 9/1982 | Ray et al. ............................... 318/139 |
| 4,387,326 | 6/1983 | Ray et al. ............................... 318/138 |
| 4,446,416 | 5/1984 | Wanlass .................................. 318/812 |
| 4,628,245 | 12/1986 | Quayle ..................................... 322/32 |
| 4,642,543 | 2/1987 | MacMinn ................................ 318/696 |
| 4,670,696 | 6/1987 | Byrne et al. ............................ 318/701 |
| 4,684,867 | 8/1987 | Miller ..................................... 318/701 |
| 4,736,151 | 4/1988 | Dishner .................................. 323/224 |
| 4,740,738 | 4/1988 | El-Antably et al. ..................... 318/701 |
| 4,855,652 | 8/1989 | Yamashita ............................... 318/268 |
| 4,884,185 | 11/1989 | Hubert ..................................... 363/56 |
| 5,051,640 | 9/1991 | Freise ..................................... 310/162 |
| 5,072,166 | 12/1991 | Ehsani .................................... 318/696 |
| 5,113,113 | 5/1992 | Tepavcevic ............................. 318/701 |
| 5,115,181 | 5/1992 | Sood ....................................... 318/701 |
| 5,187,427 | 2/1993 | Erdman ................................... 323/207 |
| 5,231,342 | 7/1993 | Bahn ...................................... 318/696 |
| 5,235,504 | 8/1993 | Sood ........................................ 363/53 |
| 5,260,620 | 11/1993 | Morrill ................................... 310/185 |
| 5,291,106 | 3/1994 | Murty et al. ............................ 318/375 |
| 5,304,882 | 4/1994 | Lipo et al. .............................. 310/156 |
| 5,319,297 | 6/1994 | Bahn ....................................... 318/701 |
| 5,355,069 | 10/1994 | Bahn ....................................... 318/701 |
| 5,373,195 | 12/1994 | De Doncker et al. .................... 307/45 |
| 5,373,223 | 12/1994 | Akagi et al. ............................ 318/722 |
| 5,376,851 | 12/1994 | Lipo et al. .............................. 310/179 |
| 5,376,867 | 12/1994 | Capetti ................................... 318/376 |
| 5,410,203 | 4/1995 | Lürkens .................................. 310/163 |
| 5,424,624 | 6/1995 | Senak, Jr. ............................... 318/701 |
| 5,449,993 | 9/1995 | Davis ...................................... 318/701 |
| 5,455,473 | 10/1995 | Lipo et al. .............................. 310/114 |
| 5,459,385 | 10/1995 | Lipo et al. .............................. 318/701 |
| 5,463,299 | 10/1995 | Futami et al. .......................... 318/618 |
| 5,545,938 | 8/1996 | Mecrow ................................. 310/156 |
| 5,672,925 | 9/1997 | Lipo et al. .............................. 310/154 |

OTHER PUBLICATIONS

Llang, et al., "A New Variable Reluctance Motor Utilizing an Auxiliary Commutation Winding," pp. 219–225, IEEE Industry Applications Society Annual Meeting, Houston, Texas (1992).

D. J. Pulle, "Performance of Split–Coil Switched Reluctance Drive," pp. 318–323, IEE Proc., Vol. 135, Pt. B, No. 6 (1988).

Wanlass et al., "New Directions in Linear Microcircuits," 1968 Wescon Technical Papers, Aug. 20–23, 1968 (U.S.A).

Miller, *Switched Reluctance Drives* pps. 3–69.

Miller, *Switched Reluctance Drives: a Reference Book of Collected Papers*, pp. 320–323, Oct. 1988, Intertec Coomunications Inc. (USA).

Vukosavic and Stefanovic, *SRM Inverter Topologies: A Comparative Evaluation,* IEEE Transactions on Industry Applications, Vol. 27, No. 6, Nov./Dec. 1991.

RELUCTANCE MACHINE WITH AUXILIARY FIELD EXCITATIONS

CROSS-REFERENCE TO RELATED APPLICATIONS

This Aplication is a continuation-in-part of U.S. patent application Ser. No. 08/599,752 filed Jan. 29, 1996, entitled "Reluctance Machine with Auxiliary Field Excitations" by the same inventor, the disclosure of which is hereby incorporated by reference.

FIELD OF THE INVENTION

This invention relates to reluctance machines and machine systems and, in particular, to switched reluctance motors and motor systems. More particularly, the present invention relates to a method and apparatus for improving the performance of a switched reluctance machine through the use of auxiliary field excitations.

BACKGROUND OF THE INVENTION

In general, a reluctance machine is an electric machine in which torque is produced by the tendency of a movable part to move into a position where the inductance of an energized phase winding is maximized. In one type of reluctance machine the energization of the phase windings occurs at a controlled frequency. These machines are generally referred to as synchronous reluctance machines. In another type of reluctance machine, circuitry is provided for detecting the position of the movable part (generally referred to as a "rotor") and energizing the phase windings as a function of the rotor's position. These types of machines are generally known as switched reluctance machines. The present invention is applicable to both synchronous and switched reluctance machines.

The general theory of the design and operation of reluctance machines in general, and switched reluctance machines in particular, is known in the art and is discussed, for example, in Stephenson and Blake, "The Characteristics, Design and Applications of Switched Reluctance Motors and Drives", Presented at the PCIM '93 Conference and Exhibition at Nuremberg, Germany, Jun. 21–24, 1993.

As explained above, the basic mechanism for torque production in a reluctance motor is the tendency of the rotor to move into a position to increase the inductance of the energized phase winding. In general, the magnitude of the torque produced by this mechanism corresponds to the magnitude of the current in the energized phase winding such that the motor torque is heavily dependent on the phase current waveforms. For an ideal motor with no magnetic saturation, the instantaneous torque T is:

$$T = 1/2 \, i^2 \frac{dL}{d\theta}$$

Where i is the instantaneous current in the energized phase winding and $dL/d\theta$ is the derivative of the phase inductance L with respect to the rotor position 0. While all practical reluctance motors have some magnetic saturation this equation is useful for purposes of the present analysis.

For ideal torque production the phase energization currents would be substantially rectangular with each phase current terminating at the point the next phase current is initiated. In practice, rectangular phase currents are not obtainable and the ideal practical phase current waveforms are trapezoidal. The rate of change of the phase energization current is limited by the back emf generated by the rotating rotor since:

$$\frac{di}{dT} \propto \frac{V_{DC} - E_{mf}}{L}$$

where $V_{dc}$ is the DC bus voltage of the power converter that provides the phase energization current, $E_{mf}$ is the back emf of the motor, and L is the inductance of the excited phase winding.

At high rotational speeds, the back emf produced by the rotating rotor $E_{mf}$ can significantly limit the ability of the power converter to provide trapezoidal energization currents. At these speeds the phase energization currents can become more triangular than trapezoidal.

These triangular phase energization currents can significantly diminish the performance of the motor. In particular, the triangular currents produce increased torque ripple and, as such, increased motor noise and vibration. Also, because of the decrease in the average phase excitation current, the power density, the performance and efficiency of the motor can be adversely affected.

In traditional reluctance machine systems the degradation of machine performance at high rotor speeds is often either ignored, avoided by avoiding high speed operation, or compensated for by increasing the DC bus voltage of the power converter. None of these "solutions" to the performance degradation are ideal. Ignorance and avoidance sidesteps the problem, and increasing the power rating of the converter both increases the overall costs of the system (by requiring higher voltage devices) and tends to decrease the overall efficiency of the system.

One suggested approach to improving the phase current waveforms was presented in U.S. Pat. No. 5,459,385. In this approach, a full-pitch commutation winding is placed in the stator of a reluctance motor and the commutation winding is coupled to the phase windings such that, upon commutation of an energized phase winding, the commutation winding absorbs, through mutual inductance, some or all of the energy stored in the magnetic field established by the energized winding. This transference of energy is purported to force the current in the commutated phase winding to drop to zero faster, thus allowing the commutation of the phase winding to occur closer to the ideal point of rotor pole/stator pole alignment. While this approach may have some advantages, it results in an commutation winding that is energized by discontinuous currents, where the current pulses applied to the commutation winding occur at the commutation points of the phase windings. These current discontinuities can result in significant flux changes in the motor which can negatively impact the motor's performance. Moreover, in these machines, the commutation winding acts as an essentially "parasitic" device in that it absorbs and, potentially stores, energy from the motor. It does not provide any significant useful energy to the motor.

It is an object of the present invention to overcome the referenced limitations, and other limitations, in the prior art by providing an increased performance reluctance machine system that has improved phase energization current waveforms; reduced noise and vibration; improved power density; and improved performance in terms of efficiency over traditional reluctance machines. It is a further object of the present invention to accomplish these improvements without significantly increasing the power rating of the converter used in the system.

SUMMARY OF THE INVENTION

In accordance with an exemplary embodiment of the present invention a reluctance machine system is provided that comprises a reluctance machine having a rotor defining a plurality of rotor poles, a stator defining a plurality of stator poles, a plurality of phase windings, and a full pitch auxiliary field winding. The auxiliary field winding is energized in such a manner that continuous currents are established in the auxiliary winding. These continuous currents contribute to the establishment of the magnetic field within the machine and improve the machine's performance.

In one embodiment of the present invention, the reluctance machine is a three phase machine and includes N*6 stator poles and N*4 rotor poles, where N is an integer. In other embodiments of the present invention the reluctance machine is a four phase machine having N*8 stator poles and N*6 rotor poles.

Various power converters may be used in conjunction with the reluctance machine of the present invention to establish continuous currents in the auxiliary field winding. In one exemplary embodiment the auxiliary field winding is coupled across the DC bus of a standard power converter. A variable resistor or a power switching device may be placed in series with the auxiliary field winding so that the magnitude of the current in the auxiliary field winding may be regulated. In a still further embodiment of the present invention a bi-polar power converter is used to provide a currents of opposite polarities to the phase windings to increase the torque production of the reluctance machine system.

In yet a further embodiment of the present invention a reluctance machine is provided that includes a stator defining a plurality of stator poles; a rotor defining a plurality of rotor poles, where the rotor is positioned to rotate relative to the stator; a first phase winding positioned within the stator, the first phase winding comprising at least a first winding coil, and the first winding coil encircling at least one stator pole; a second phase winding positioned within the stator, the second phase winding comprising at least a second winding coil, the second winding coil encircling a number of stator poles greater than one but different from the number of stator poles encircled by the first winding coil; and a fully-pitched auxiliary winding positioned within the stator. The reluctance machine of this embodiment includes stator windings of three different types (e.g., short-pitched, fractional-pitched, and fully-pitched).

In accordance with another exemplary embodiment of the present invention a reluctance machine is provided that utilizes an auxiliary field winding in accordance with the teachings of the present invention in a stator constructed from conventionally-shaped stator laminations. The stator for such novel reluctance machine includes a stack of stator laminations defining a is plurality of stator poles and inter-pole slots; a short-pitched phase winding positioned about a first set of stator poles, the short-pitched winding comprising at least two short-pitched coils; a plurality of fractional-pitched phase windings, each fractional-pitched phase winding being positioned about a set of stator poles, each fractional-pitched phase winding comprising at least one fractional-pitched coil; and an auxiliary field winding positioned within the stator, the auxiliary field winding comprising at least one winding coil; wherein portions from each short-pitched coil from the short-pitched phase winding share stator slots with portions of at least one fractional-pitched coil from a fractional-pitched phase winding, such that the number of stator slots shared by the short-pitched and the fractional-pitched coils is less than the total number of stator slots, and wherein the at least one winding coil from the auxiliary field winding does not share slots with any of the short-pitched or fractional-pitched coils.

Other aspects, devices and methods of the present invention will be apparent to one of ordinary skill in the art having the benefit of this disclosure.

BRIEF DESCRIPTION OF THE DRAWINGS

Similar reference characters indicate similar parts throughout the several views of the drawings.

DETAILED DESCRIPTION OF THE INVENTION

Figure 1:
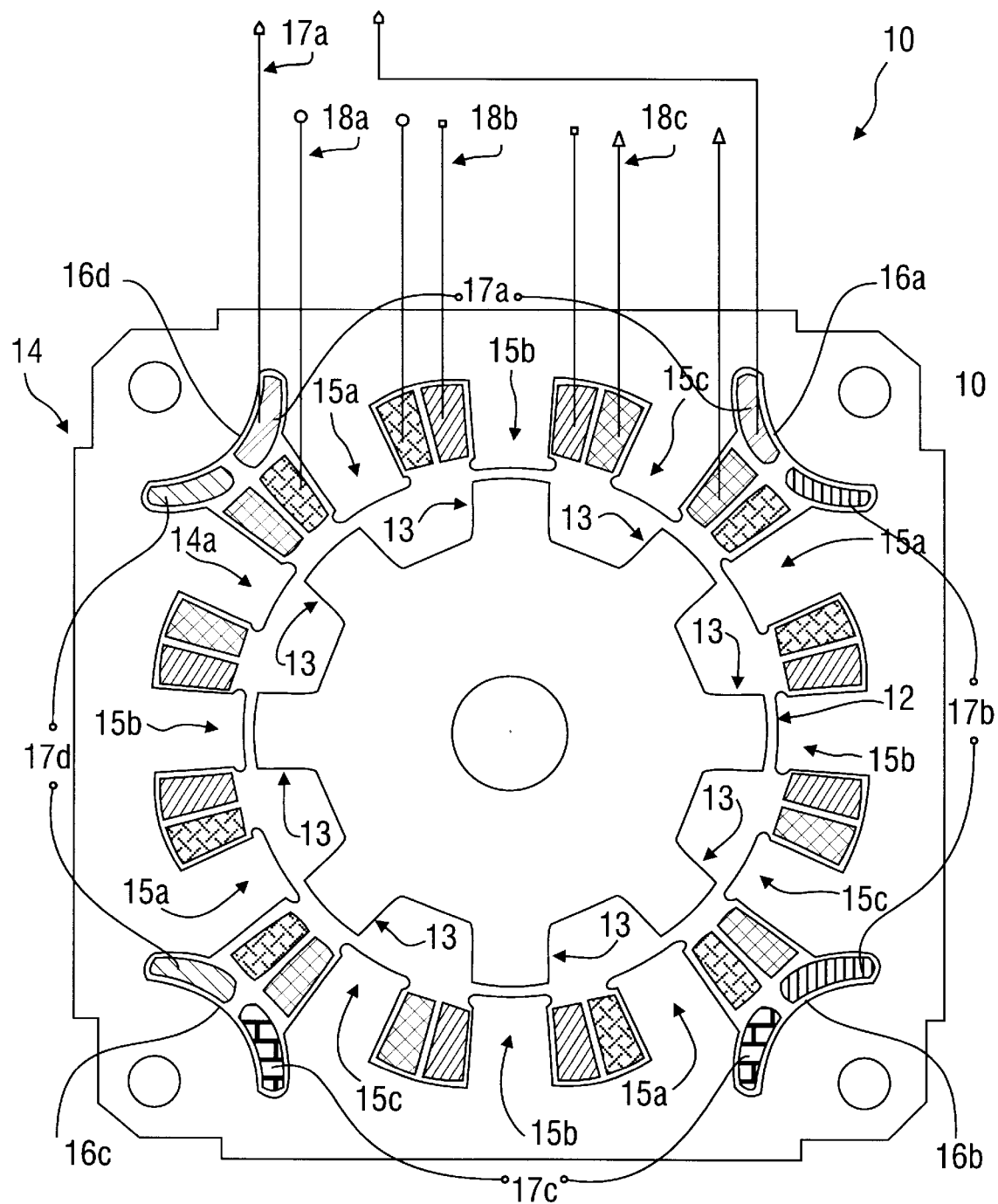
FIG. 1 illustrates a cross-sectional view of a reluctance machine in accordance with the present invention.

Turning to the drawings and, in particular FIG. 1, a cross sectional view of a reluctance machine 10 in accordance with the present is provided. In general, the machine 10 comprises a rotor 12 having eight evenly spaced rotor poles 13 and a stator 14 having twelve evenly spaced stator poles defining stator pole sets 15a, 15b and 15c, where each stator pole set comprises four stator poles.

The rotor 12 may be of standard construction and may consist, for example, of stack of identical steel rotor laminations.

The stator 14 may be constructed from a stack of identical steel stator laminations in accordance with standard techniques with one significant exception. Four of the slots that define the stator poles, slots 16a, 16b, 16c and 16d, are modified by deepening to provide additional spacing to accommodate auxiliary filed coils 17a, 17b, 17c and 17d which are placed into the Y-shaped spaces defined by the modified slots 16a–16d. Each of the auxiliary field coils comprises a coil of copper that is positioned within the deepened slots 16a–16d such that each coil encircles three stator poles.

Because the machine of FIG. 1 is a three phase, eight rotor pole machine, each of the auxiliary field coils 17a–17d is a "full pitch" coil in that it spans 360° electrical degrees. In other words, a full pitch winding includes winding coils that surround N stator poles where N is an integer and where N is equal to the number of phase windings (or phases) in the machine. This is true for phase windings that are comprised of coils where each coil surrounds a single stator pole.

The auxiliary field coils 17a–17d may be connected in series, parallel, or a combination of series and parallel (e.g., the parallel connection of 17a and 17b in series with the parallel connection of 17c and 17d). In the embodiment of FIG. 1, the auxiliary field coils are connected in series to provide a single auxiliary field winding.

Three phase windings 18a, 18b and 18c are associated with the three stator pole sets 15a 15c and are placed in the slots defined by the stator poles 15. In general, each phase winding comprises four coils of copper wire where each coil within a phase winding is positioned around one of the stator poles 15 that comprise the stator pole set associated with that phase winding. The four coils that comprise a phase winding may be connected in series or in parallel or a combination of series and parallel. In the embodiment of FIG. 1, the phase winding coils are connected in series to provide three separately energizable phase windings 18a, 18b and 18c.

When constructing a stator such as stator 14 in FIG. 1, the winding coils comprising the auxiliary field coils 17a–17d should be positioned within the stack of stator laminations before the coils comprising the phase windings 18a–18c are positioned in the stator stack.

In traditional reluctance machines, the phase energization current flowing in the phase windings performs two basic function: (i) it serves to establish the magnetic field of the machine; and (ii) it serves to interact with the established magnetic field to produce torque. These roles of the phase energization current and their impact on the total torque production of the machine may be mathematically expressed as follows:

$$T = T_a + T_b + T_c = 1/2\, i_a^2 \frac{dL_a}{d\theta} + 1/2\, i_b^2 \frac{dL_b}{d\theta} + 1/2\, i_c^2 \frac{dL_c}{d\theta}$$

Since $L_a = N_a^2 P_a$; $L_b = N_b^2 P_b$ and $L_c = N_c^2 P_c$ (where $N_p$ is the number of turns of the associated phase winding p and $P_p$ is the permeance of the associated phase winding p):

$$T = 1/2\, i_a N_a \frac{dP_a}{d\theta} (i_a N_a) + 1/2\, i_b N_b \frac{dP_b}{d\theta} (i_b N_b) + 1/2\, i_c N_c \frac{dP_c}{d\theta} (i_c N_c)$$

For analytical purposes, the above equation may be interpreted to show that, for each phase P, a portion of the phase energization current $N_p i_p$ goes to establishing the magnetic field of the machine and a portion $$I_P N_P \frac{dN_p}{d\theta}$$

goes to interacting with this field to produce torque.

In the motor of FIG. 1, unlike in traditional reluctance motors, the auxiliary field winding also plays a role in the establishment of the magnetic field of the machine. This is particularly true when continuous currents are established in the auxiliary winding. Referring back to FIG. 1, it may be noted that each auxiliary field coil 17a–17d encircles three stator poles where each of the three stator poles is surrounded by a coil from one of the phase windings 18a–18c. As such, there is some mutual inductance between each auxiliary field coil and the phase windings 18a–18c. Thus, when a phase winding and the auxiliary field winding are energized simultaneously, there will be a torque producing contribution provided by the change in inductance of the phase winding and a torque producing contribution provided by the change in the mutual inductance between the phase and auxiliary windings. Mathematically, this total torque can be represented on a per-phase basis as:

$$T_{phase} = 1/2\, i_p^2 \frac{dL_p}{d\theta} + 1/2\, i_p i_f \frac{dL_{pf}}{d\theta} + 1/2\, i_f i_p \frac{dL_{fp}}{d\theta}$$

Assuming that that mutual inductance between the phase winding and the auxiliary winding is the same as the mutual inductance between the auxiliary winding and the phase winding, then the per-phase torque for the motor of FIG. 1 can be represented as:

$$T_{phase} = 1/2\, i_p^2 \frac{dL_p}{d\theta} + i_p i_f \frac{dL_{pf}}{d\theta}$$

From an analysis of the above equation, it may be noted that for a given phase energization current i, and an arbitrary continuous field current $i_f$, the total torque produced by the motor of FIG. 1 will be greater than that obtainable from a standard reluctance machine with the same phase current. Since $$\frac{dL}{d\theta} = \frac{N^2 dP_f}{d\theta} \text{ and } \frac{dL_{pf}}{d\theta} = N_P N_f \frac{dP_p}{d\theta},$$

total phase current may be represented as:

$$T_{phase} = 1/2\, i_p N_p \frac{dP_p}{d\theta} (i_p N_p) + i_p N_p \frac{dP_p}{d\theta}\, i_f N_f$$

If it is assumed that the number of turns in the auxiliary field winding is the same as that of the phase winding (i.e., $N_a = N_f$) and that the magnitude of the phase energization current is the same as the magnitude of the continuous current in the auxiliary field winding (i.e., $i_p = i_f$) the above equation indicates that the motor of FIG. 1 provides approximately three times the power density of a standard reluctance machine with the same phase energization currents, since:

$$T_{(standard)} = 1/2\, i_p^2 \frac{dL_p}{d\theta}$$

$$T(\text{FIG. 1}) = \frac{1}{2}\, i_p^2 \frac{dL_p}{d\theta} + i_p^2 \frac{dL_p}{d\theta} = \frac{3}{2}\, i^2 \frac{dL_2}{d\theta}$$

-continued $$\frac{T_{(FIG.\ 1)}}{T_{(Standard)}} = 3$$

The above equations are exemplary only in that it is unlikely that the magnetic flux of a standard machine can reach three times its normal maximum magnitude. Nonetheless, the calculations above indicate that the reluctance machine of FIG. 1 can provide improved torque densities for the same phase current magnitudes. Alternately, the above calculations indicate that, using a machine constructed in accordance with FIG. 1, the same currents (and thus the same power converter) used with a standard reluctance machine can be used to drive a larger machine constructed in accordance with FIG. 1 to provide increased torque output. Still further, given the same currents, the same torque output can be provided for a phase winding with fewer turns (i.e., a smaller $N_p$). Such a reduction in the number of turns would provide a lower inductance this allowing the current to change more rapidly over time and allowing for a better current waveform and faster torque response. This reduction in the phase inductance could also reduce the copper losses of the machine.

In addition to allowing a given magnitude of phase energization currents to provide increased torque output, the machine of FIG. 1 can allow for a smaller (and thus less costlier) power converter to provide a given output torque than was previously possible with standard reluctance machines. If it is assumed, as before, that the number of turns of the field winding is the same as that of the phase winding and that the field current is the same as that of the phase energization currents, then the relationship between the per-phase torque available from a standard reluctance machine and the machine of FIG. 1 can be expressed as:

$$3/2\ i_p^2 \frac{dL_p}{d\theta} = 1/2\ i_{p(std)}^2 \frac{dL_p}{d\theta}$$

Solving for $i_p$ it may be demonstrated that. for the same torque output, only $$\frac{1}{\sqrt{3}}\ i_{p(std)}$$

required using a machining accordance with FIG. 1. This reduction in the required phase energization current for the same torque output allows for the use of smaller power converters that would otherwise be required and allows for an overall improvement in motor efficiency since the $I^2 R$ losses resulting from the phase energization currents are also reduced.

Still further, for a given power converter rating or given DC bus voltage, the machine of FIG. 1 allows for faster torque response, reduced torque ripple and better phase current waveforms that would be available with a standard machine. Alternately, the same torque response and motor performance can be obtained with a power converter comprising lower current rated switching devices and with a lower DC bus voltage that would otherwise be possible.

Based on the above it can be determined that, for increased torque purposes, the magnitude of the auxiliary field current should be positive and, for a relatively constant torque output, continuous. The use of such a continuous auxiliary filed current tends to establish a relatively constant level of magnetic flux in the machine, thus reducing the extent of flux variations and thus the iron losses that such flux variations can produce.

Figure 2A:
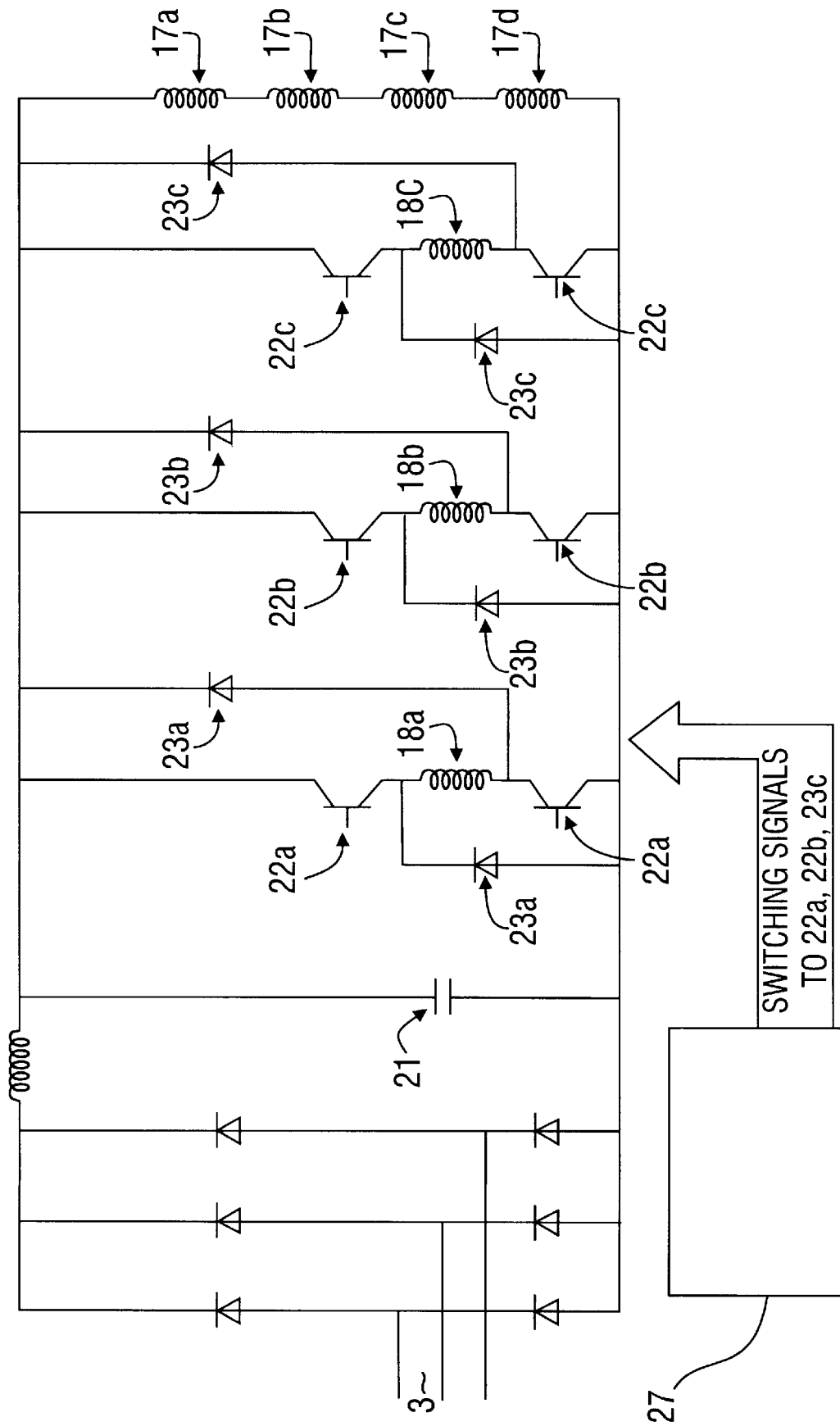
FIGS. 2a and 2b illustrate power converters for energizing the machine of FIG. 1 and for providing continuous auxiliary field excitation currents.

FIG. 2a illustrates a power converter 20 than can be used in conjunction with the reluctance machine 10 of FIG. 1. Power converter 20 is similar to standard power converters used with reluctance machines in that two power switching devices 22a–22c, and two antiparallel diodes 23a–23c are coupled to each of the phase windings 15a–15c and the power converter's DC bus. In the power converter of FIG. 2, the DC bus is established across a DC capacitor 21. A switching circuit 27 is provided for detecting the position of the rotor with respect to the stator and energizing the phase windings as a function of the rotor's position. The precise construction of switching circuit 27 will vary with the application of the system. It may be constructed using standard switching circuits known to those skilled in the relevant art.

Unlike a standard power converter, which generally consists of the switches 22 and diodes 23, the power converter 20 also includes circuitry for coupling the auxiliary field winding comprising coils 17a–17c in series across the DC bus.

When the power controller 20 of FIG. 2a is used with a reluctance machine of the type illustrated in FIG. 1, the magnitude of the current in the auxiliary field winding will be fairly constant (assuming the DC bus voltage is constant) and the auxiliary field current will be continuous. This auxiliary field current can be set by selecting the resistance of the total auxiliary field winding such that the current through the winding, when coupled to the constant is DC bus voltage, is the desired current. The resistance of the total auxiliary field winding can be established through standard motor winding design techniques by properly selecting the number of turns in the auxiliary filed winding. In general, the higher the number of turns, the higher the resistance of the auxiliary field winding and the lower the total auxiliary field current.

Figure 2B:
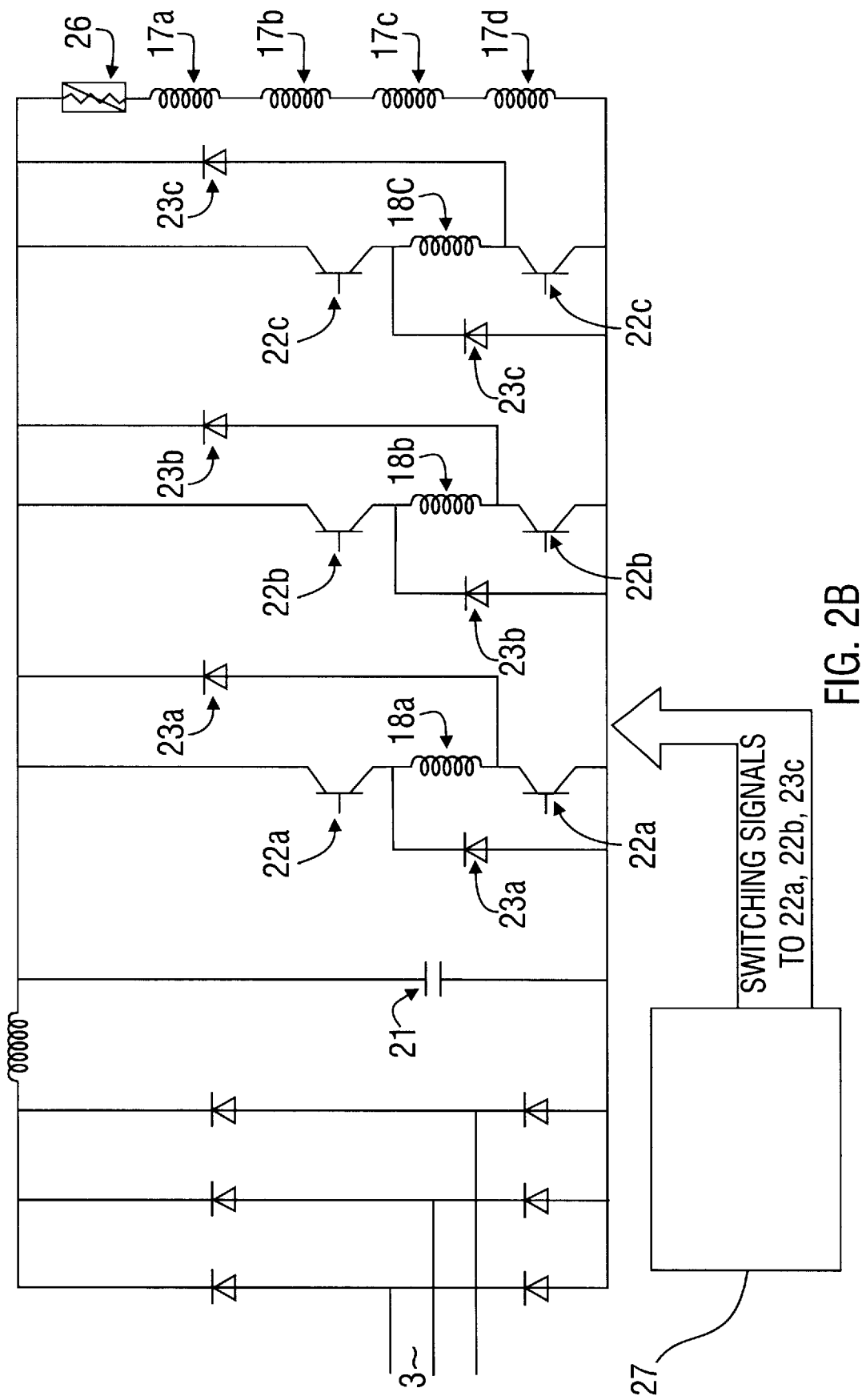

An alternate power converter arrangement for providing constant auxiliary field current is illustrated in FIG. 2b. This power converter is similar to the one of FIG. 2a with the exception that a variable resistor 26 is connected in series between one terminal of the auxiliary field winding and the DC bus. In this arrangement, the magnitude of the auxiliary field current can be controlled by adjusting the resistance of variable resistor 26.

As indicated above, for most applications, optimum machine performance can be established when the auxiliary field current is continuous and of a constant magnitude such that the flux contribution from the auxiliary winding is constant. It has been found that, when constant auxiliary field current it used, improved machine performance can be obtained when the magnitude of the auxiliary field current is such that the stator core is magnetically saturated when the auxiliary phase winding is energized and the peak air-gap flux is on the order of 1.0–1.5 Teslas. The precise current magnitudes necessary to achieve these results will vary from machine to machine and can be determined through the use of finite element analysis or empirical testing of a given machine.

Present analysis suggests that, for purposes of machine efficiency, there is an optimum auxiliary field current point such that adjustment of the auxiliary field current above or below this point causes a decrease in overall machine efficiency. This optimum auxiliary field current point may be determined empirically through testing of an actual motor or through the use of finite element analysis.

Figure 3:
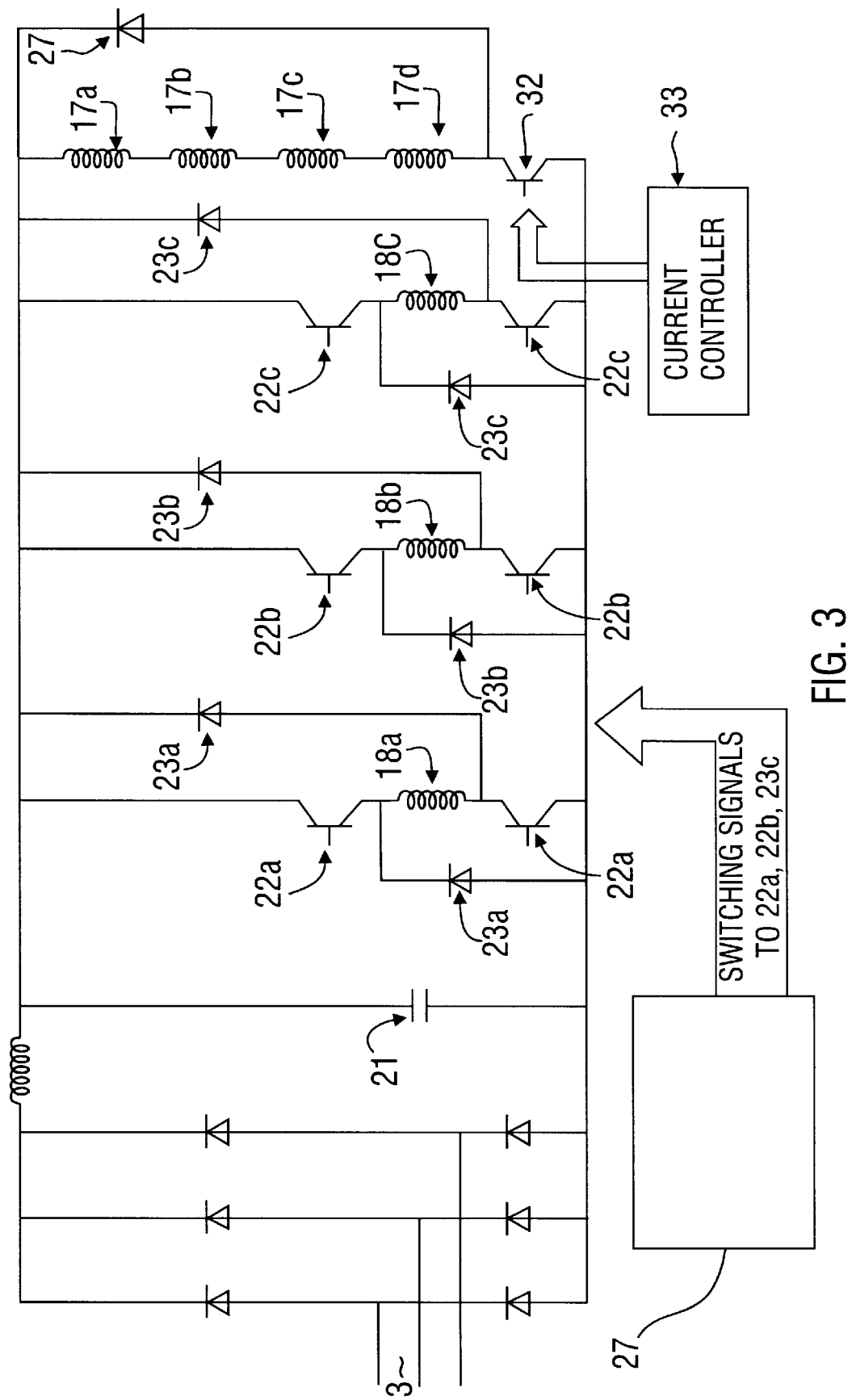
FIG. 3 illustrates a power converter for energizing the reluctance machine of FIG. 1 that allows for regulation of the continuous auxiliary field excitation currents.

In certain applications it may be desirable to control the magnitude of the auxiliary field current to control the magnetic flux of the machine. FIG. 3 illustrates a power converter 30 that allows for regulation of the auxiliary field current. In general, the power converter 30 is similar to power converter 20 of FIG. 2a, with the exception of a power switching device 32 coupled in series between the auxiliary phase winding and the DC bus. A feedback diode 27 is also added to provide a freewheeling current path. Through the use of known current techniques (e.g., pulse width modulation, pulse frequency modulation, bang-bang current control and the like) it is possible to use the converter of FIG. 3 to control the current in the auxiliary field winding and thus the magnetic flux of the machine.

The power converter 30 of FIG. 3 allows for the construction of a simple and elegant reluctance machine system where the torque output of the reluctance machine is controlled solely by controlling the current in the auxiliary phase winding. In such a system, the phase switching devices 32 are switched ON or OFF and are used only for commutation purposes and not to regulate the current level in the phase windings. As such, the switching circuitry for the switching devices 22 can be relatively simple compared to the complex phase current control circuits often used in standard reluctance system. To allow for torque control, circuitry 33 is provided for controlling the switching of switching device 32 as a function of a parameter intended to be controlled (e.g., rotor speed, torque, etc.). Standard feedback and control techniques may be used to construct switching circuit 33.

For many applications the power converter of FIG. 3 can be used to control the torque of the motor by maintaining the rotational period over which the phase windings are energized constant and regulating the magnitude of the energization current in the auxiliary winding. For other applications, torque control can be accomplished by both adjusting the rotational period over which the phase windings are energized and regulating the energization current in the auxiliary field winding. In either event, the system of FIG. 3 allows for variable torque control without regulating the current in the phase windings.

The simple control scheme of FIG. 3 is believed to be beneficial in that it allows for variable torque control without the need for complex control circuitry.

The current control scheme of FIG. 3 is representative of the types of current control circuits that may be used with a reluctance machine constructed in accordance with the teachings of this disclosure. Alternate control schemes can be used. For example, the power switching device 32 could be coupled between the positive rail of the DC bus and the auxiliary field winding, or upper and lower switching devices could be used. Thus, it is possible for one to vary from the specific control scheme of FIG. 3 and still appropriate the spirit and essence of the present invention.

The reluctance machine of FIG. 1 and the controllers of FIGS. 2a–2b and 3 were described in the general context of a 12/8 reluctance machine. The use of auxiliary field windings is not limited to this particular stator pole/rotor pole combination and such windings may be used with a number of different reluctance machines. For example, FIG. 4 illustrates the use of an auxiliary field winding in the context of a 6 stator pole/4 rotor pole reluctance machine.

Figure 4:
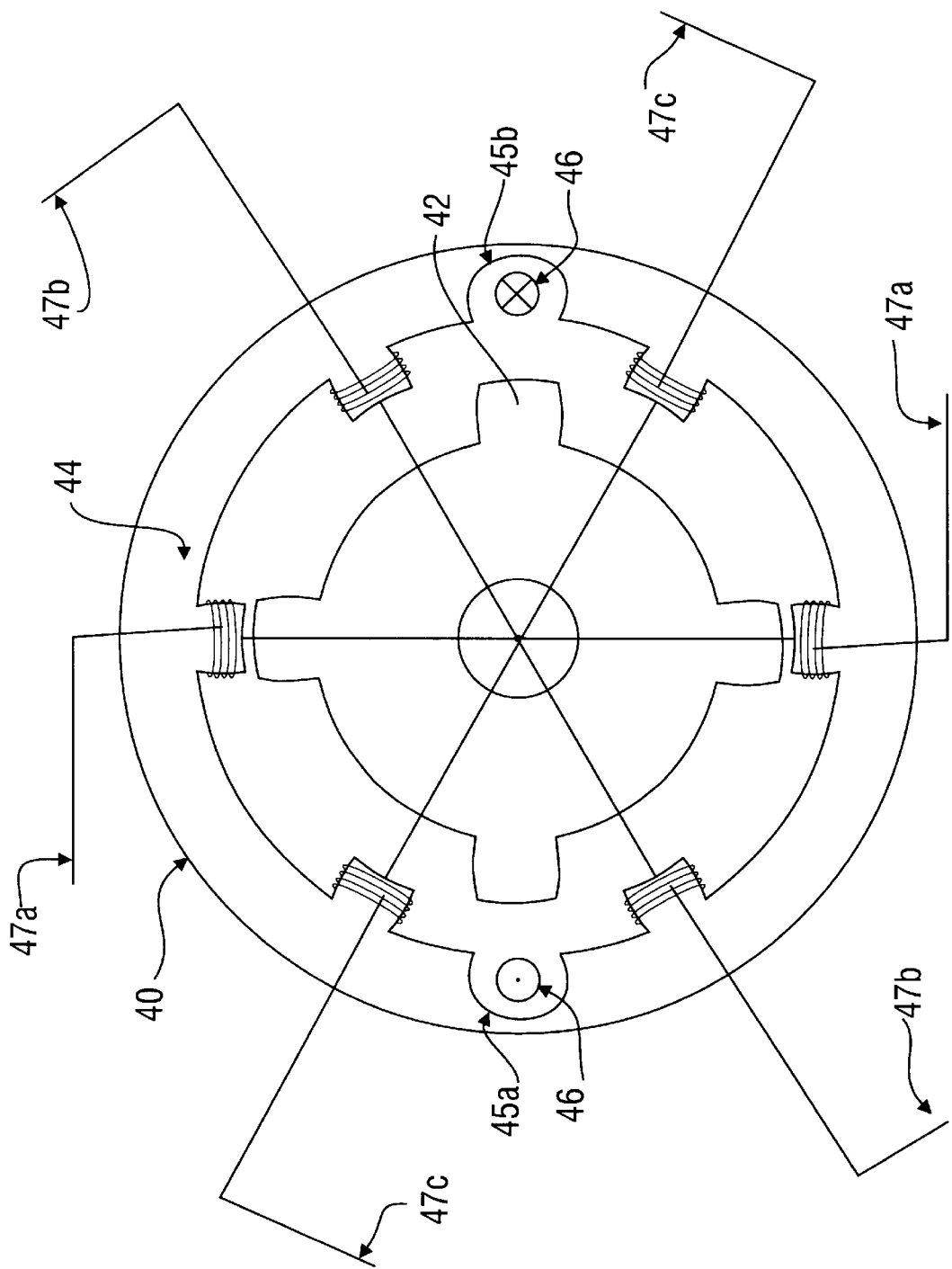
FIG. 4 illustrates a cross-sectional view of an alternate embodiment of a reluctance machine in accordance with the present invention having six stator poles and four rotor poles.

The machine 40 of FIG. 4 comprises a four pole rotor 42 that may be constructed according to known techniques. The stator 44 is of essentially standard construction except that two slots of the stator 45a and 45b have been modified by deepening to accommodate an auxiliary field winding 46. In the particular example of FIG. 4, auxiliary field winding 46 comprises a single coil. In the machine arrangement of FIG. 4 the auxiliary filed winding 46 is a full pitch winding in that the coil defining the winding spans 360° electrical, and in that the coil comprising the winding surrounds three stator pole in the three phase machine. Three phase windings 47a, 47b and 47c surround the stator poles in a traditional fashion.

The machine of FIG. 4 may be controlled using power converters similar to those illustrated in FIGS. 2a, 2b and 3 which establish a continuous current in the auxiliary, winding.

Figure 5:
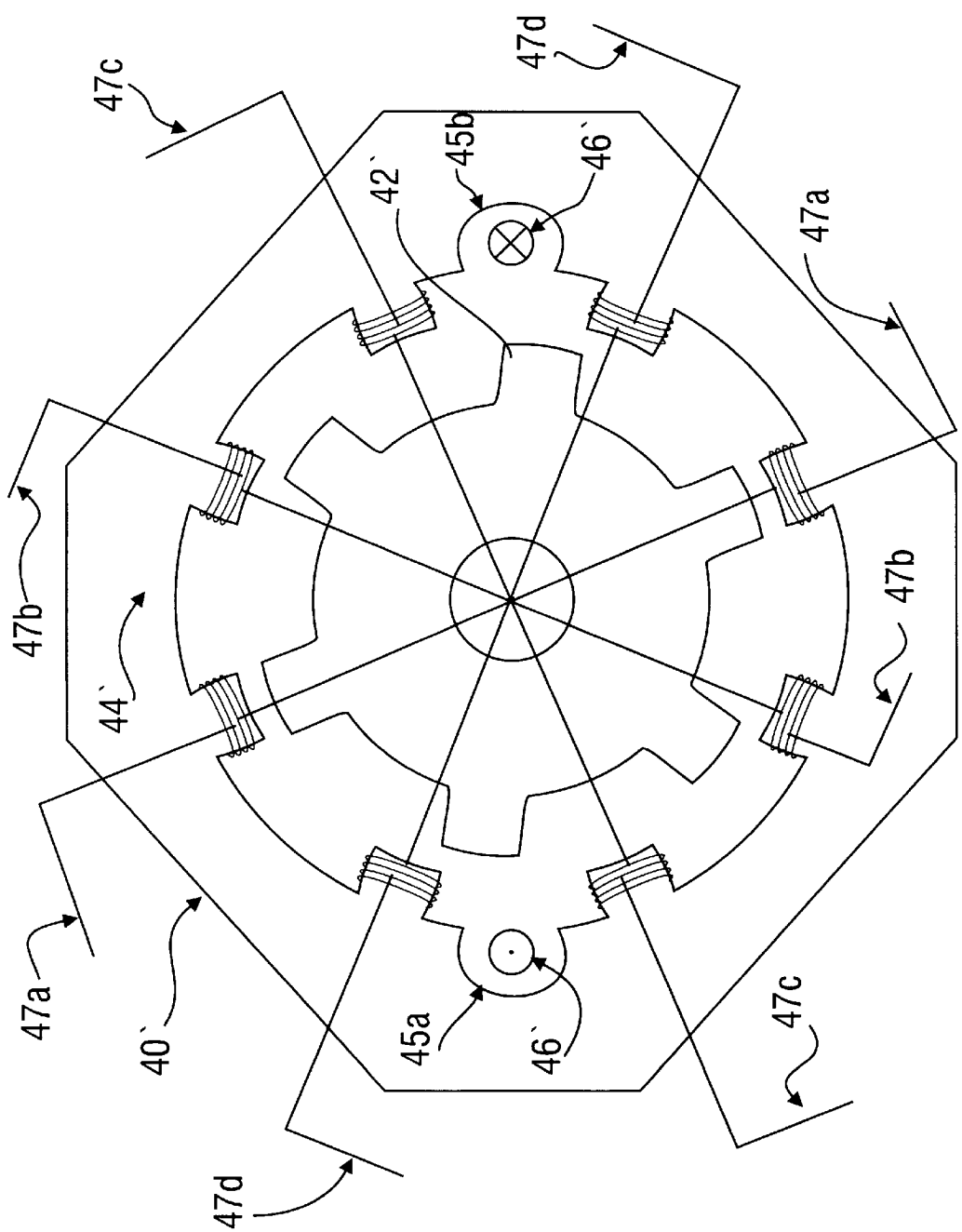
FIG. 5 illustrates a cross-sectional view of yet an alternate embodiment of a reluctance machine in accordance with the present invention having eight stator poles and six rotor poles.

FIG. 5 illustrates a reluctance machine designed in accordance with the teachings of the present disclosure that includes a stator 44' having eight stator poles and rotor 42' having six rotor poles. Unlike the machines of FIGS. I and 4, the machine of FIG. 5 is a four phase machine as there are four phase windings 47a–47d. Each of the phase windings comprises two coils surrounding diametrically opposite stator poles. An auxiliary winding 46' surrounds four stator poles. Since the machine of FIG. 5 is a four phase machine, the auxiliary winding is a full pitch winding.

While FIGS. 1, 4 and 5 illustrate 12/8, 6/4 and 8/6 machines in accordance with the present invention, the present invention is not so limited and the principals disclosed herein can be used to construct a machine having a different number of rotor and stator poles. In particular, the principals disclosed herein may be used to construct a N*8/N*4 machine, a N*6/N*4 machine, or a N*8/N*6 machine, where N is an integer, or any other operable stator pole/rotor pole combination.

The use of a reluctance machine in accordance with the present invention can allow for improved control topologies that can increase the toque output of the machine system. In particular, bi-polar power converters that allow the phase energization currents to vary in polarity can significantly increase the torque output of the machine system.

Figure 6:
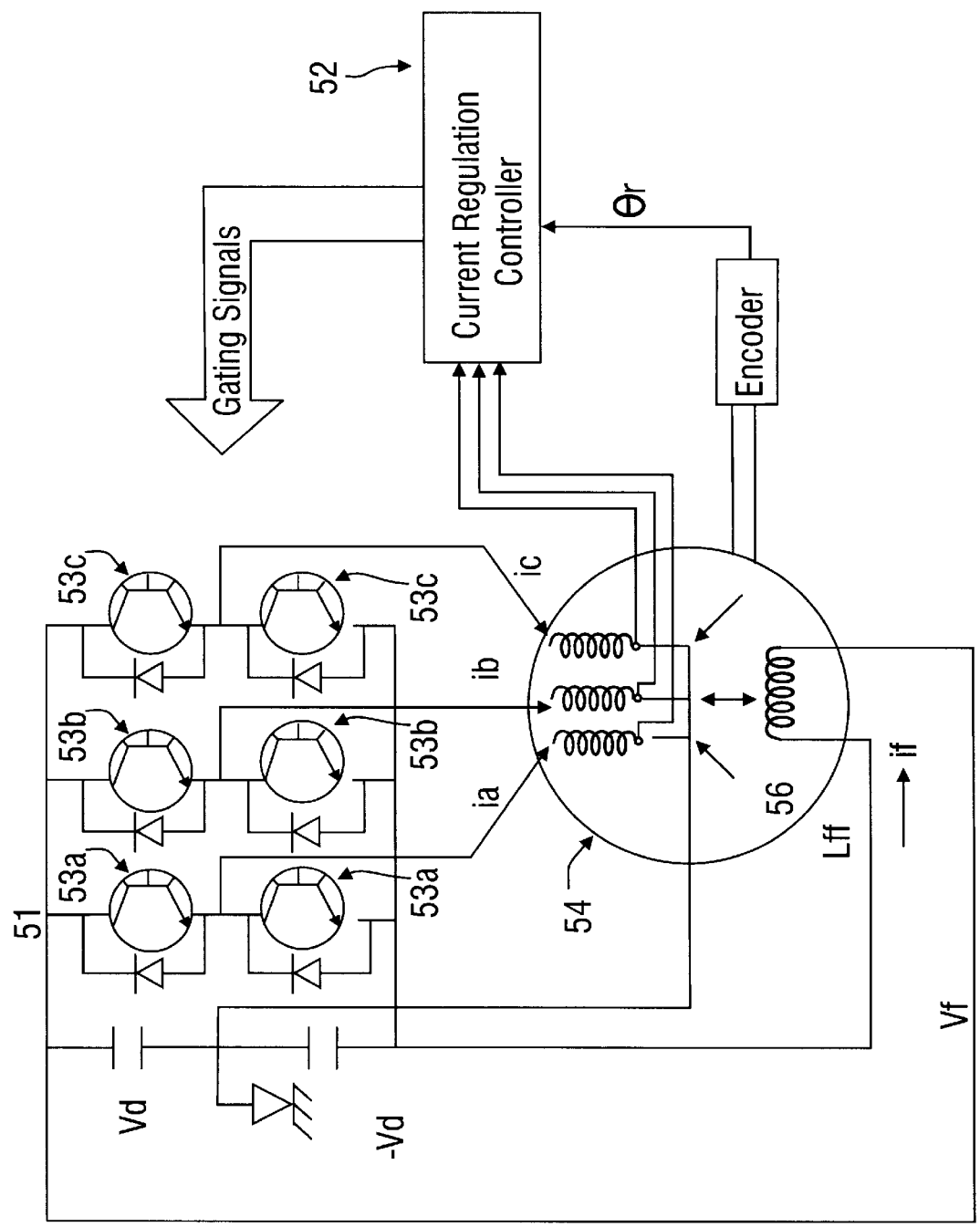
FIG. 6 illustrates a reluctance machine system in accordance with the present invention in which bi-polar phase energization currents are utilized.

FIG. 6 illustrates a machine control system 50 that may be used in conjunction with a reluctance machine according to the present invention (e.g., the machine of FIG. 4) to provide increased torque output. In general, the machine control system 50 comprises a bi-polar power converter 51 and a current regulation controller 52. Bi-polar power converter 51 in turn comprises power switching device pairs 53a, 53b and 53c that are coupled to the three phase windings a, b and c, of a reluctance machine 54 constructed in accordance with the present invention. The auxiliary field winding 56 of the machine 54 is coupled across the DC bus of power converter 51 such that the auxiliary winding is constantly energized so as to establish continuous currents in the auxiliary field winding and a substantially constant magnetic field in the machine.

Because the auxiliary field winding in the system of FIG. 6 establishes a stable magnetic field in the machine, the torque produced by the rotor will be a function both of the reluctance torque and torque produced by the relationship between the flux linking the auxiliary field winding and the energized phase. Mathematically, the total torque can be expressed as a combination of the reluctance torque plus the "flux-linking" torque as follows:

$$T_{phase} = 1/2\, i_{phase}^2 \frac{dL}{d\theta} + i_{phase} \frac{d\psi}{d\theta}$$

where $$\frac{d\psi}{d\theta}$$

is the derivative of the change in the flux linking the auxiliary field to the energized phase winding as a function of the rotor's position.

By properly controlling the phase current though the use of bi-polar current control, improved torque performance can be established.

Figure 7:
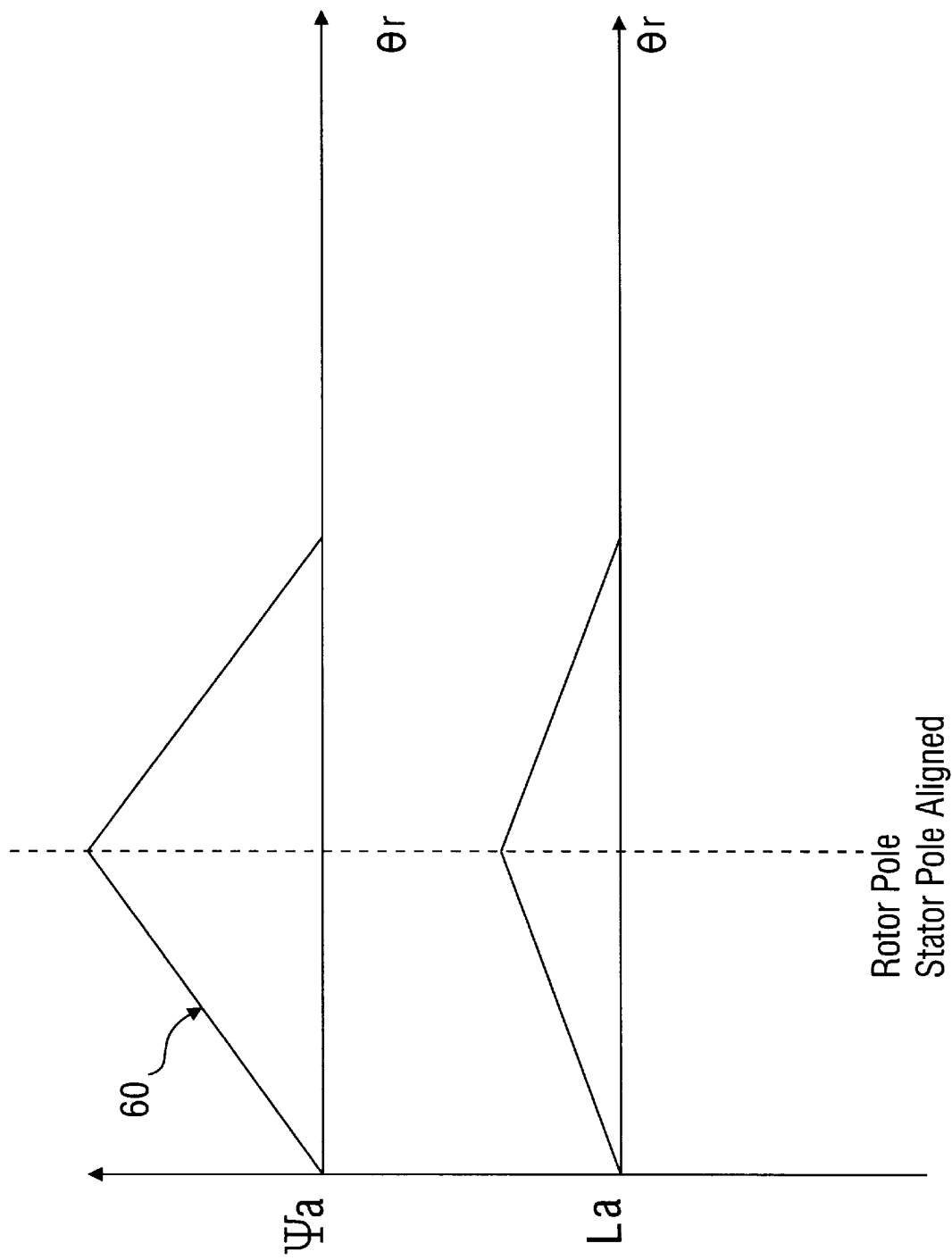
FIG. 7 illustrates the flux linking phase winding A of the machine system of FIG. 6 with the auxiliary winding and the self inductance of phase winding A.

FIG. 7 illustrates several characteristics of the machine system of FIG. 6 for a representative phase winding for a constant auxiliary field current including: (i) the flux linking the auxiliary field winding and the phase winding as a function of rotor position 60 and (ii) the self inductance L of the phase as a function of rotor position 62. Referring to the flux linkage illustration 60 of FIG. 7, it may be noted that the flux linkage increases as a rotor pole becomes aligned with an energized stator pole (providing a positive)

$$\frac{d\psi}{d\theta}$$

and decreases thereafter (providing a negative).

$$\frac{d\psi}{d\theta}$$

The self inductance of the phase winding L, illustration 62, indicates that the self inductance characteristics vary in a manner similar to the flux linkages 60.

Referring back to the equation for total phase torque in the system of FIG. 6 it may be noted that the reluctance torque is a function of the current squared multiplied by the derivative of the self inductance of the phase as a function of the rotor's position. As such, changes in the polarity of the phase current should not affect the reluctance torque of the system. The "flux linking" torque, however is a function of both the phase current and the derivative of the flux linkage. As such, if the magnitude of the phase current is adjusted from a positive value to a negative value at the point in which the flux linkage stops increasing and begins to decrease, positive flux linkage torque can always be produced. Moreover, because the flux linkage can be established such that the sum of the flux linkage torque and the reluctance torque is always positive, even when the $$\frac{dL}{d\theta}$$

is negative, positive torque can always be obtained.

Figure 8:
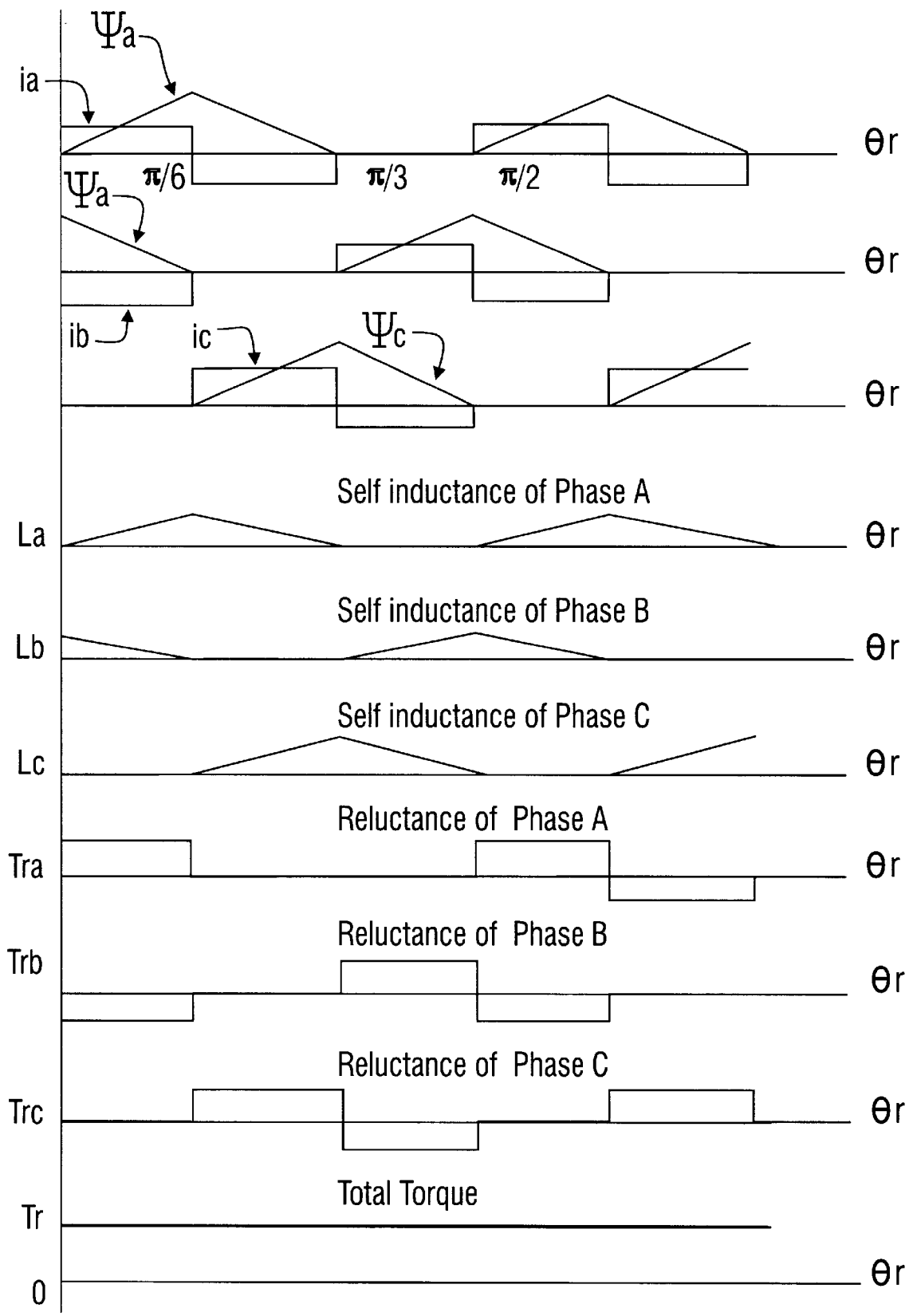
FIG. 8 illustrates the flux linkages, phase inductances, and phase currents for the machine system of FIG. 6.

This operating characteristic of the system of FIG. 6 is generally illustrated in FIG. 8 which illustrates the waveforms of FIG. 7 for all three phases, as well as the individual phase currents. As these figures indicate, the system of FIG. 6 may be used to increase the average torque output and to allow for the overlapping energization of the various phase windings. While this system requires a relatively complex power converter to allow for the establishment of bidirectional currents in the phase windings, it provides performance advantages in the form of increased torque output.

The construction of a current controller to provide the current waveforms of FIG. 8 is believed to be well within the ability of a person of ordinary skill in the motor art having the benefit of this disclosure. As such it is not addressed in detail herein. Moreover, it should be noted that the system and control techniques discussed above in connection with FIG. 6 are not limited to the particular 6/4 reluctance machine of FIG. 4 but can be used in connection with different machines having different stator pole/rotor pole combinations.

Figure 9:
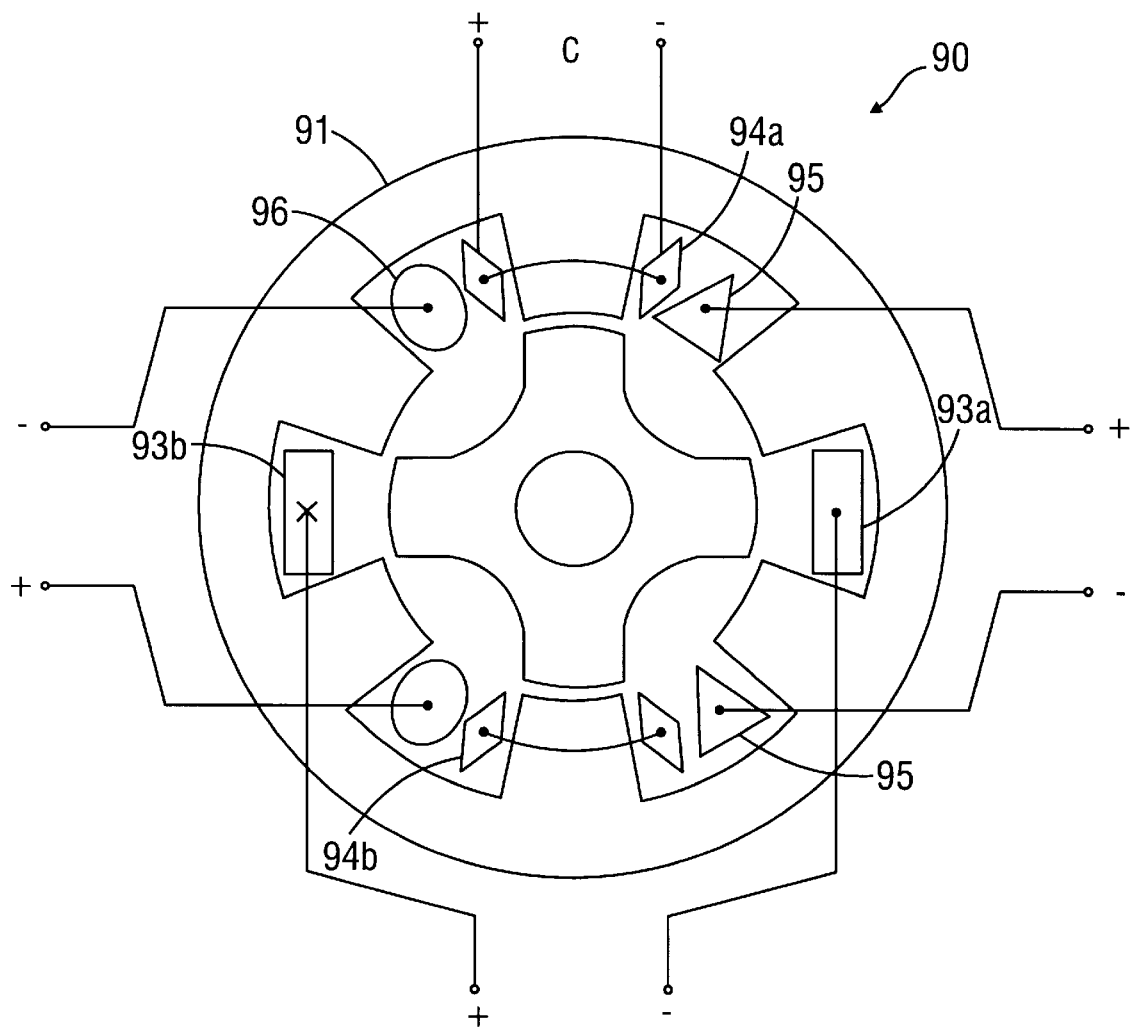
FIG. 9 illustrates a machine constructed according to the teachings of the present invention utilizing conventional stator laminations.

In the exemplary embodiments discussed above in connection with FIGS. 1, 4 and 5, the stator laminations of the exemplary machines were adapted in a non-conventional manner to accommodate the auxiliary filed winding. Alternate embodiments of the present invention are envisioned wherein conventional stator laminations (e.g., round stator laminations) are employed to provide a machine in accordance with the teachings of the present invention. FIG. 9 illustrates one such machine.

Turning to FIG. 9, a three-phase reluctance machine 90 is illustrated. The machine includes a stator 91 that is constructed from a stack of conventional stator laminations, where each stator lamination defines six inwardly projecting stator poles. A conventional four pole rotor 92 is positioned within the stator and is free to rotate.

Placed within the stator 91 and about the stator poles are three phase windings A, B and C and one auxiliary field winding F.

In the exemplary embodiment of FIG. 9, the auxiliary field winding F is a fully-pitched winding that is positioned within stator slots 93a and 93b. The coil side turns of the auxiliary field winding F are placed in the stator such that positive electric current flows out of the coil side turn marked with a dot (·) and into the coil side turn marked with a cross (x). The fully-pitched auxiliary winding F operates to improve machine performance in the same general manner as the auxiliary windings associated with the previously-discussed exemplary embodiments of the present invention.

In machine 90, the phase C winding is formed from two "short-pitched" coils 94a and 94b. Each of the coils 94a and 94b is short-pitched in that it surrounds a single stator pole. The two coils may be coupled together in series to form a single phase C winding. In the embodiment of FIG. 9, the short-pitched coils 94a and 94b are positioned such that positive electric current flows into the coil side turn portions marked with a cross (x) and out of the coil side turn portions marked with a dot (·).

Each of the phase A and B windings of machine 90 is formed from a single "fractional-pitched" coil with phase A comprising fractional-pitched coil 95 and phase B comprising fractional-pitched coil 96. Coils 95 and 96 are "fractional-pitched" coils in that the number of stator poles encircled by each coil is greater than one but less than the total number of phases. In the exemplary embodiment of FIG. 9, each of the fractional-pitched coils 95 and 96 encircles two stator poles. The direction of positive electric current flow for coils 95 and 96 is reflected using the same dot (·) and cross (x) designations discussed in connection with the auxiliary field winding F and the phase C winding.

In machine 90, the phase C winding comprises two short-pitched coils, while the phase A and B windings each comprise only a single fractional-pitched coil. To ensure that each of the three phases A, B and C are balanced, the machine should be wound such that the total number of ampere-turns for the three phase windings are equal. Thus, the each of the coils 95 and 96 should have the same number of ampere-turns AT and each of the coils 94a and 94b should have one-half of this number 0.5AT such that the total number of ampere-turns associated with the phase C winding is equal to that of the phase A and B windings. Looked at in a different way, the total area spanned by each of the fractional-pitched coils should be twice that of the total area spanned by the short-pitched coils. Thus, for the stator slots that are shared by a fractional-pitched and short-pitched coils (e.g., slot 96) the fractional-pitched coil should fill ⅔ of the slot and the short pitched coil should fill ⅓ of the slot. With this winding arrangement the total area spanned by each of the phase windings will be equal (e.g., 2 * (1 pole+2 (⅓ slot))=2 poles+2 (⅔ slot)).

Figure 10:
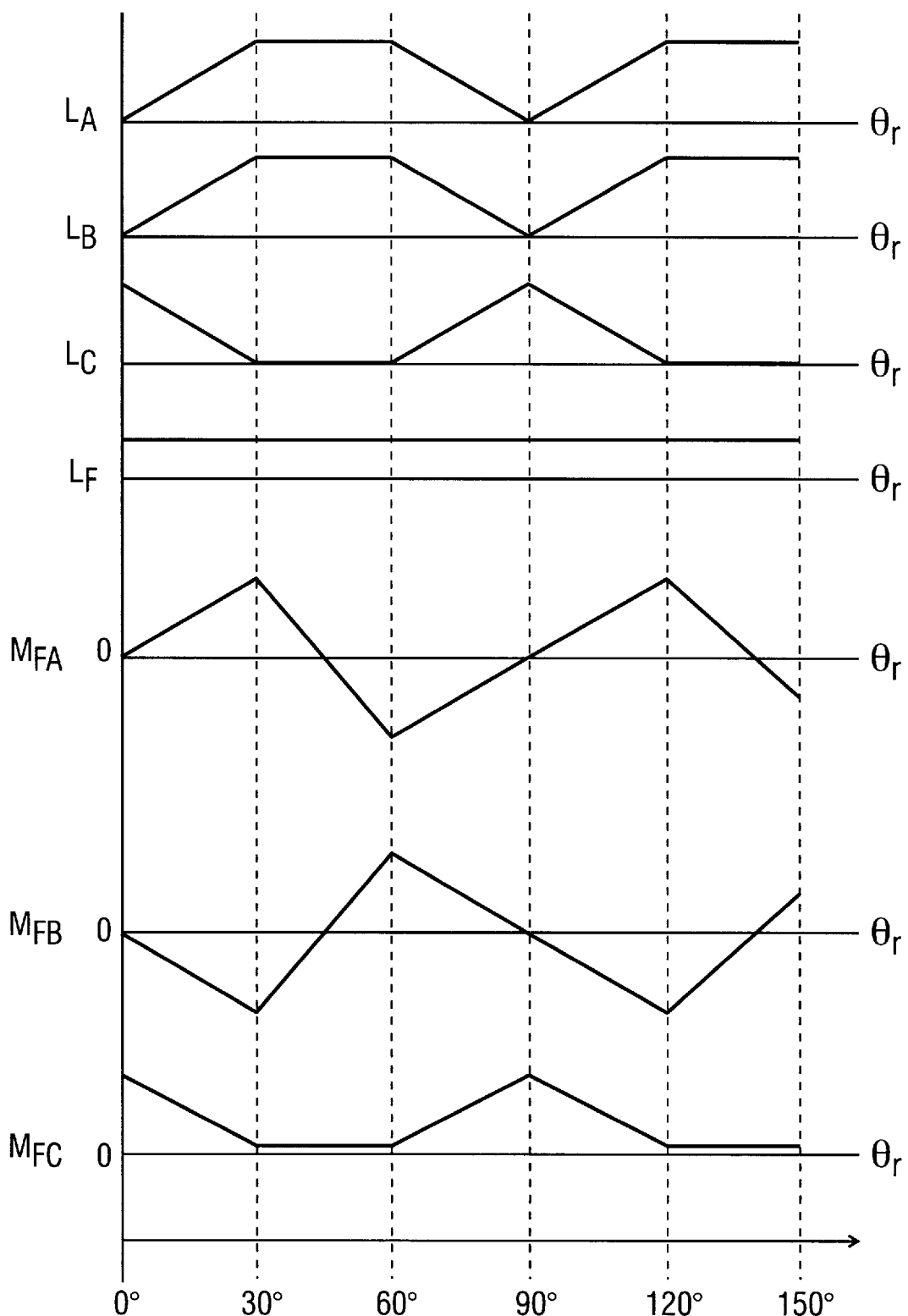
FIG. 10 illustrates the self-inductances for and various mutual-inductances between the windings of the machine of FIG. 10.

FIG. 10 illustrates the self-inductances L for the three phase windings $L_A$, $L_B$ and $L_C$ and for the auxiliary field winding LF. FIG. 10 also illustrates the mutual inductances $M_{AF}$, $M_{BF}$, and $M_{CF}$ between the three phase windings A, B and C and the auxiliary field winding F. Because of the symmetry of machine 90, only a portion of the entire 360 degrees (mechanical) of rotor rotation is illustrated in FIG. 10. Unless otherwise specifically indicated or indicated by context, all references to degrees herein are to mechanical degrees. The totality of the inductance waveforms for an entire 360 degree interval will be apparent to those of ordinary skill in the art having the benefit of this disclosure.

From a review of FIG. 10 it may be noted that the self-inductance of the fractionalpitched phase A and B windings are in-phase and follow the same general pattern. Thus, over the 0–30 degree rotor interval, the self inductances of both the phase A and phase B windings ($L_A$ and $L_B$) are increasing, over the 30–60 degree interval both are relatively constant interval, and both are decreasing over the 60–90 degree interval.

In the embodiment of FIG. 9, the coils comprising the phase A and B windings are positioned within the stator such that the magnetic field produced when positive electric current is applied to the phase A winding is not in alignment (and is substantially opposed to) the magnetic field produced when positive electric current is applied to the phase B winding. As such, the waveform for the mutual-inductance between the phase A winding and the auxiliary field winding F is substantially a mirror image of the waveform for the mutualinductance between the phase B winding and the auxiliary field winding F. This is reflected in FIG. 10 where, over each interval where the $M_{AF}$ waveform is increasing, the $M_{BF}$ waveform is decreasing and vice versa.

Figure 11A:
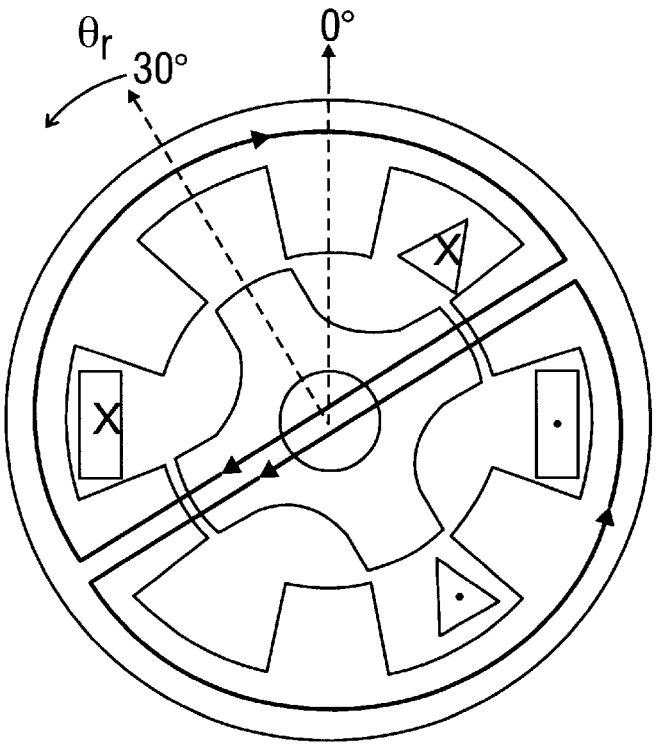
FIGS. 11A–11C illustrate, in an idealized manner, the flux patterns that may be set up in the reluctance machine of FIG. 9.

While the $M_{AF}$ and $M_{BF}$ waveforms essentially mirror images of one another, it must be noted that the slopes of the $M_{AF}$ and $M_{BF}$ waveforms over each 30 degree interval of rotor rotation are not constant. This is aspect of the mutual-inductances of machine 90 may be better understood from FIGS. 11A–11C which generally illustrate, in an idealized manner, the flux patterns that set up in the reluctance machine 90 for various rotor positions where switching acts occur. In FIGS. 11A and 11C the dot and cross convention described above is used to illustrate the application of electric current to the various phase windings. In each figure, substantially constant, continuous DC current is applied to the phase F winding.

FIG. 11A illustrates the rotor position and flux pattern that will exist for the machine 90 when the rotor is in essentially complete alignment with one of the stator poles corresponding to energized phase A. At this point, the mutual-inductance between the phase A winding and the auxiliary field winding will be at its peak value, as reflected in FIG. 10. FIG. 10 indicates that at the 30 degree rotor position (where the rotor is in alignment with phase A) the mutual-inductance between the phase A winding and the auxiliary field winding F is at its maximum or peak positive value. Notably, the rotor position reflected in FIG. 11A also corresponds to the rotor position at which the mutual-inductance between the phase B winding and the auxiliary field winding F ($M_{BF}$) is at its minimum or peak negative value. Further, at the rotor position reflected in FIG. 11A, the mutual inductance between the phase C winding and the auxiliary field winding F ($M_{CF}$) is at its minimum. For purposes of discussion it is assumed that the phase A winding is energized over the 0–30 degree rotor interval and that at the 30 degree rotor position reflected in FIG. 11A the phase A winding is de-energized and the phase B winding energized.

Figure 11B:
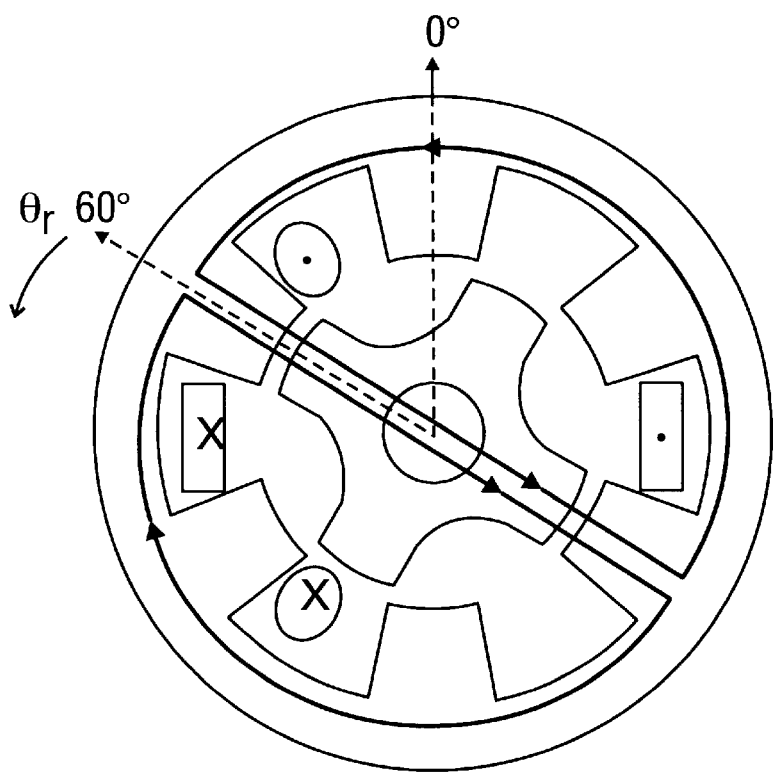
Figure 11C:
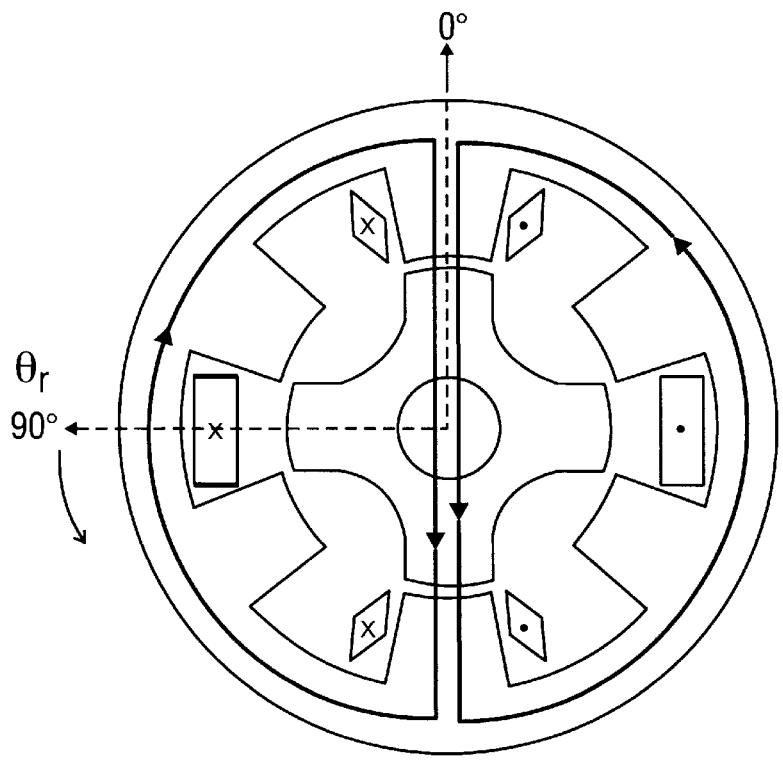

Assuming counter-clockwise rotation, FIG. 11B illustrates the rotor position and flux pattern that will exist in the machine 90 when the rotor has rotated 30 degrees counter-clockwise to the 60 degree position. At this rotor position, the rotor is in complete alignment with the one of the stator poles associated with the energized phase B winding. Thus, at this rotor position, the mutual-inductance between the energized phase B winding and the auxiliary field winding $M_{BF}$) is at its maximum or peak positive value. Conversely, at this point the mutual-inductance between the phase A winding and the auxiliary field winding F ($M_{AF}$) is at its minimum or peak negative value. At the 60 degree rotor position, the mutual inductance between the phase C winding and the auxiliary field winding ($M_{CF}$) is at its minimum. For purposes of this example it is assumed that the phase B winding is energized over the 30–60 degree interval and that, at the 60 degree rotor position, the phase B winding is de-energized and the phase C winding energized.

As FIGS. 11A and 11B illustrate, and as reflected in FIG. 10, over the 30 degree interval of rotor rotation from the 30 degree position to the 60 degree position, the mutualinductance between the phase A winding and the auxiliary field winding F ($M_{AF}$) transitions from its peak positive value to its peak negative value. Conversely, over the same 30 degree interval, the mutual-inductance between the phase A winding and the auxiliary field winding F ($M_{AF}$) transitions from its peak negative value to its peak positive value.

FIG. 11C illustrates the rotor position and flux pattern that will generally exist in the machine 90 after the rotor has rotated another 30 degrees counter-clockwise from the position illustrated in FIG. 11B. Thus, in FIG. 11C the rotor is at the 90 degree position, and poles of the rotor are essentially completely aligned with the stator poles energized by the phase C winding. At the rotor position of FIG. 11C the mutual-inductance between the phase C winding and the auxiliary field winding F is at its maximum or peak positive value.

Notably, at the rotor position reflected in FIG. 11C, the mutual-inductance between the phase A winding and the auxiliary field winding F ($M_{AF}$) is essentially zero, as is the mutual-inductance between the phase B winding and the auxiliary field winding F $M_{BF}$). Thus, while $M_{AF}$ and $M_{BF}$ went from their maximum values to their minimum values (or vice versa) over the 30 degree interval corresponding to 30–60 degrees, over the 30 degree interval corresponding to 60–90 degrees, $M_{AF}$ and $M_{BF}$ went from their maximum (or minimum) only to zero. Thus, the absolute values of the slopes of the $M_{AF}$ and $M_{BF}$ waveforms over the 60–90 degree interval will be essentially half-that of the absolute values of the slopes of the waveforms over the 30–60 degree interval. This is generally reflected in FIG. 10.

For purposes of this example it is assumed that the phase C winding is energized over the 60–90 degree interval and that, at the 90 degree rotor position, the phase C winding is deenergized and the phase A winding energized. Assuming that the rotor continues to rotate in a counter-clockwise direction, the rotor will rotate from the 90 degree position of FIG. 11C to a rotor position (e.g., the 120 degree position) where rotor poles are essentially in complete alignment with the stator poles energized by the phase A winding. This rotor position is the same as reflected in FIG. 11A, which is the rotor position where $M_{AF}$ is at its maximum and $M_{BF}$ is at its minimum.

As the above indicates, the $M_{AF}$ and $M_{BF}$ waveforms have regions of differing slopes including one (e.g., the 30–60 degree interval) where $M_{AF}$ and $M_{BF}$ transition from one extreme value to the other over a 30 degree interval and another where $M_{AF}$ and $M_{BF}$ transition form one extreme to another over a 60 degree interval (e.g., the 60–120 degree interval).

The self-inductance waveform of the short-pitched phase C winding is not in phase with the self-inductance waveform of the fractional-pitched phase A and B windings and does not have the same general form as the waveforms for the phase A and B windings. In particular, for the phase C winding there is no interval where the self-inductance is non-zero and relatively constant as with the interval 30–60 degree interval for the phase A and B windings. The waveform for the mutual-inductance between the phase C winding and the auxiliary field winding F is not in-phase with either the $M_{AF}$ or $M_{BF}$ waveforms and has a different form than those waveforms.

Because the auxiliary field winding F is a fully-pitched winding its self-inductance waveform is relatively constant for all rotor positions.

Assuming that the phase A, B and C windings all have essentially the same total ampere-turns, the peak positive values for $M_{AF}$, $M_{BF}$ and $M_{CF}$ will all be essentially equal and the peak negative values for $M_{AF}$ and $M_{BF}$ will be essentially the same and will correspond in absolute value to the peak positive values of $M_{AF}$ and $M_{BF}$. Moreover, because the absolute values of the magnitudes of the extremes of $M_{AF}$, $M_{BF}$ and $M_{CF}$ are all essentially equal, the relative slopes of the waveforms will generally be as illustrated in FIG. 10. During the 0°–30° interval, the slopes of the $M_{AF}$, $M_{BF}$ and $M_{CF}$ waveforms will all have essentially the same absolute value $$\frac{\partial M}{\partial \theta}.$$

If this term is used to define a single unit of slope, it will been appreciated that the absolute values of the slopes for the waveforms will also equal $$\frac{\partial M}{\partial \theta}.$$

for the 60°–120° interval degree interval. Over the 30°–60° interval, however, the absolute values of the slopes for $M_{AF}$ and $M_{BF}$ will equal 2

$$\frac{\partial M}{\partial \theta}.$$

This is important because the torque output of the machine 90 depends, in part, on the slopes of the $M_{AF}$, $M_{BF}$ and $M_{CF}$ waveforms over various rotor intervals.

For a given rotor position θ the total torque output T for the machine of FIG. 9 will correspond generally to:

$$T = \frac{1}{2} I_A^2 \frac{\partial L_A}{\partial \theta} + \frac{1}{2} I_B^2 \frac{\partial L_B}{\partial \theta} + \frac{1}{2} I_C^2 \frac{\partial L_C}{\partial \theta} + I_A I_F \frac{\partial M_{AF}}{\partial \theta} + I_B I_F \frac{\partial M_{BF}}{\partial \theta} + I_C I_F \frac{\partial M_{CF}}{\partial \theta}$$

where $I_A$, $I_B$, $I_C$ and $I_F$ represent the magnitude of the currents in the phase A, B or C windings and the auxiliary field winding F; and θ represents the rotor position.

Figure 12:
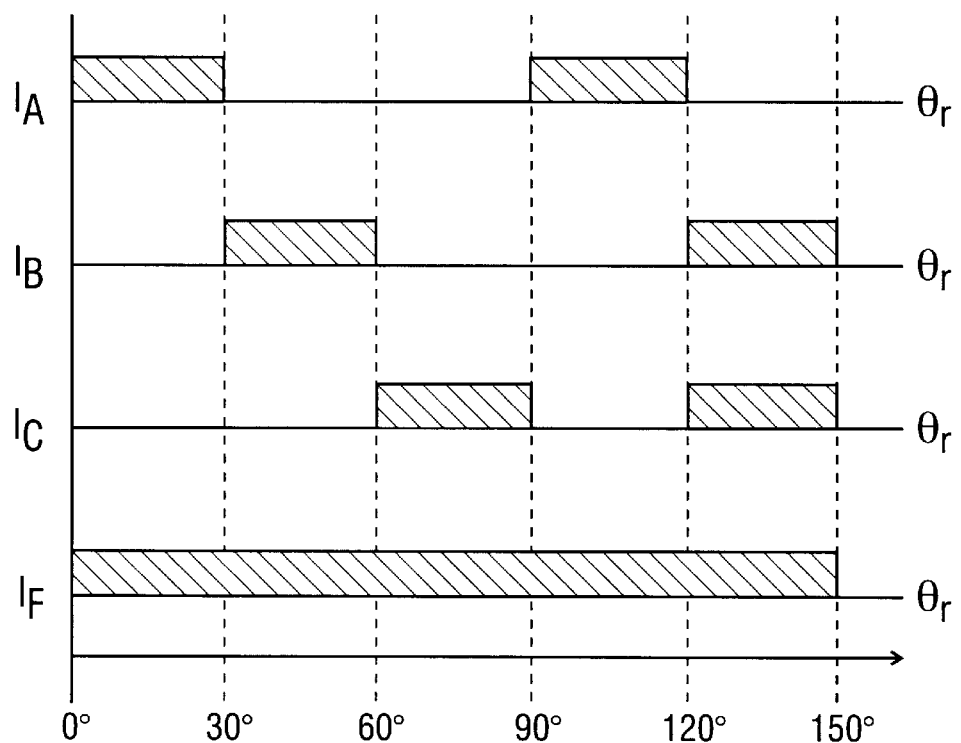
FIG. 12 illustrates a novel energization scheme for energizing the machine of FIG. 9.

From an analysis of the preceding equation, and a review of FIG. 10 it will be apparent to those of ordinary skill in the art having the benefit of this disclosure that there are a number of possible energization schemes that may be used control the machine 90 to produce desired output torque. FIG. 12 illustrates one novel energization scheme for the machine 90.

Turning to FIG. 12 an energization scheme is disclosed in which non-overlapping uni-polar currents are applied to the phase A, B and C windings and continuous, relatively constant DC current is applied to the auxiliary field winding F. In the exemplary energization scheme positive current is applied to the phase A for all rotor positions at which $$\frac{\partial L_A}{\partial \theta}$$

is positive for the desired direction of rotation. Similarly, positive current is applied to the phase C winding for all rotor positions at which $$\frac{\partial L_C}{\partial \theta}$$

is positive for the desired direction of rotation. Positive current is applied to the phase B winding for all rotor positions at which the change of the mutual-inductance between the phase B winding and the auxiliary filed winding F as a function of rotation in the desired direction—i.e., $M_{BF}$—is increasing.

Through the use of the energization scheme of FIG. 12 the total torque output of the machine 90 at various rotor positions will be a function of: (i) a torque contribution resulting from the change in the self-inductance of one of the fractional-pitched winding; (ii) a torque contribution resulting from the change in the self-inductance of the short-pitched winding; (iii) a torque contribution resulting from the change in the mutual-inductance between a phase winding and the auxiliary field winding; or (iv) the sum or (iii) and either (i) or (ii). Thus, over the 0°–60° rotor interval, the total output torque will comprise the sum of the positive torque contribution resulting from the change in the self-inductance of the phase A winding $$\left( \text{i.e.,} \frac{1}{2} I_A^2 \frac{\partial L_A}{\partial \theta} \right)$$

and the positive torque contribution resulting from the change in the mutual-inductance between the phase A winding and the auxiliary field winding F $$\left( \text{i.e.,} I_A I_F \frac{\partial M_{AF}}{\partial \theta} \right).$$

Over the 30°–60° rotor interval, the total torque output will comprise the positive torque contribution resulting from the change in the mutual-inductance between the phase B winding and the auxiliary field winding $$\left( \text{i.e.,} I_B I_F \frac{\partial M_{BF}}{\partial \theta} \right).$$

Finally, over the 60°–90° degree rotor interval, the total output torque will comprise the sum of the positive torque contribution resulting from the change in the self-inductance of the phase C winding $$\left( \text{i.e.,} \frac{1}{2} I_C^2 \frac{\partial L_C}{\partial \theta} \right)$$

and the positive torque contribution resulting from the change in the mutual-inductance between the phase A winding and the auxiliary field winding F $$\left(\text{i.e., } I_C I_F \frac{\partial M_{CF}}{\partial \theta}\right).$$

Because of the symmetry of machine 90, this cycle will repeat over the entire 360 degrees of rotor rotation.

From the above discussion, it will be apparent that the total resulting output torque for machine 90, when energized according to the energization scheme of FIG. 12 corresponds, on a per phase basis, to:

$$T_A = \frac{1}{2} I_A^2 \frac{\partial L_A}{\partial \theta} + I_A I_F \frac{\partial M_{AF}}{\partial \theta}$$

$$T_B = I_B I_F \frac{\partial M_{BF}}{\partial \theta} \text{ ; and}$$

$$T_C = \frac{1}{2} I_C^2 \frac{\partial L_C}{\partial \theta} + I_C I_F \frac{\partial M_{CF}}{\partial \theta}$$

As explained above, there are certain intervals of rotor rotation (e.g. the 30°–60° interval) where the value of the slope of the $M_{BF}$ waveform is essentially twice the peak slope of the $M_{CF}$ waveform and twice the slope of $M_{AF}$ over the rotor intervals over which the phase A winding is energized. For the energization scheme of FIG. 12, these certain intervals correspond to the intervals over which the phase B winding is energized. Thus, the total torque output for the phase B winding may be expressed as $$T_B = I_B I_F \frac{\partial M_{CF}}{\partial \theta} + I_B I_F \frac{\partial M_{CF}}{\partial \theta}.$$

This total torque output is approximately equal to $T_A$ and $T_C$. This is especially true when the energization scheme of FIG. 12 is implemented because, at the time the current in the phase B winding is commutated on, the self-inductance of the phase B winding is at its peak. As such, the phase B current faces higher commutation inductance than the other phase windings (which are commutated on at relatively low self-inductance points) and this tends to render the slope of the current build-up for Phase B slightly less than that for the phase A and C windings. This slight reduction in the phase B current tends to ensure that the total torque output for the phase B winding is approximately that of the phase A and B windings. Accordingly, although the components of the output torque are different on a per phase basis, the total output torque between the phases is substantially balanced. Careful design of the machine 90 and the phase windings, is required to maintain this torque balance.

Because the energization scheme of FIG. 12 requires only uni-polar excitation currents, any of the power converters of FIGS. 2A, 2B, 3 or 6 may be used to implement the energization scheme of FIG. 12 with the machine of FIG. 9.

Those of ordinary skill in the art having the benefit of this disclosure will appreciate that the energization scheme of FIG. 12 is but one example of the types of energization schemes that may be used with machines such as machine 90 to provide desired output torque. For example, in the energization scheme of FIG. 12, the phase B winding is energized such that its torque contribution results from changes in $M_{BF}$ and not from changes in $L_B$ as a function of rotor position. For desired rotation in the opposite direction, the phase B winding would be energized such that its torque contribution results from changes in $M_{BF}$ and from changes in $L_B$. In that alternate energization scheme the phase A winding would be energized such that its torque contribution results from changes in $M_{AF}$ but not from changes in $L_A$ as a function of rotor position. Still further excitation schemes utilizing overlapping bi-polar excitation currents are envisioned. One such bi-polar excitation scheme is illustrated in FIGS. 13A–13C.

Figure 13A:
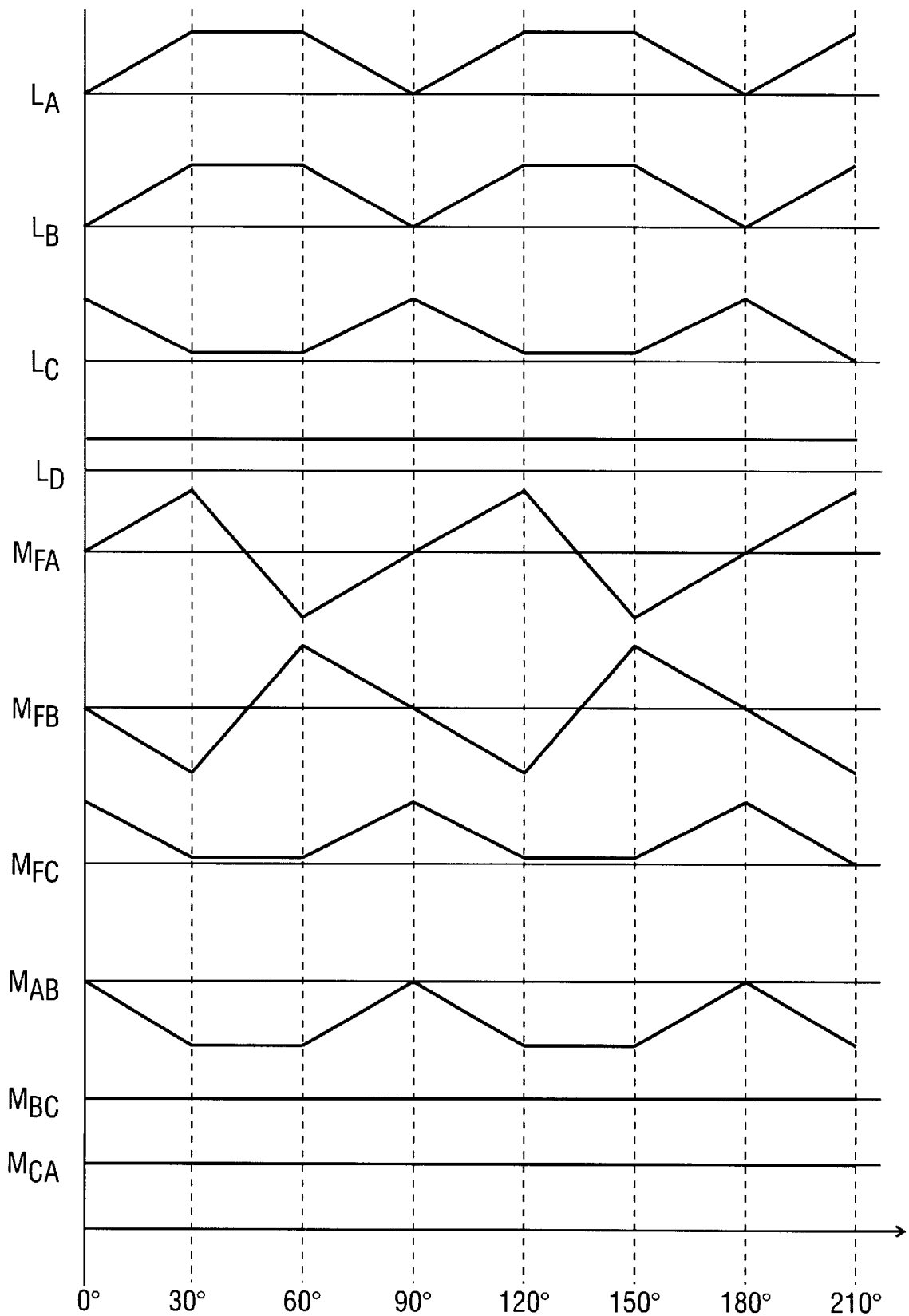
FIGS. 13A–13C illustrate an alternate energization scheme for energizing the machine of FIG. 9 and an exemplary power converter for implementing the alternate scheme.

FIG. 13A illustrates the self-inductances and various mutual inductances for the reluctance machine 90 in a manner similar to that of FIG. 10. In addition to the mutual-inductances between the phase A, B and C windings and the auxiliary field winding, FIG. 13A also illustrates the mutual-inductance that exist between the phase A winding and the phase B winding ($M_{AB}$); the mutual-inductance between the phase B winding and the phase C winding ($M_{BC}$); and the mutual inductance between the phase C winding and the phase A winding ($M_{CA}$)

Figure 13B:
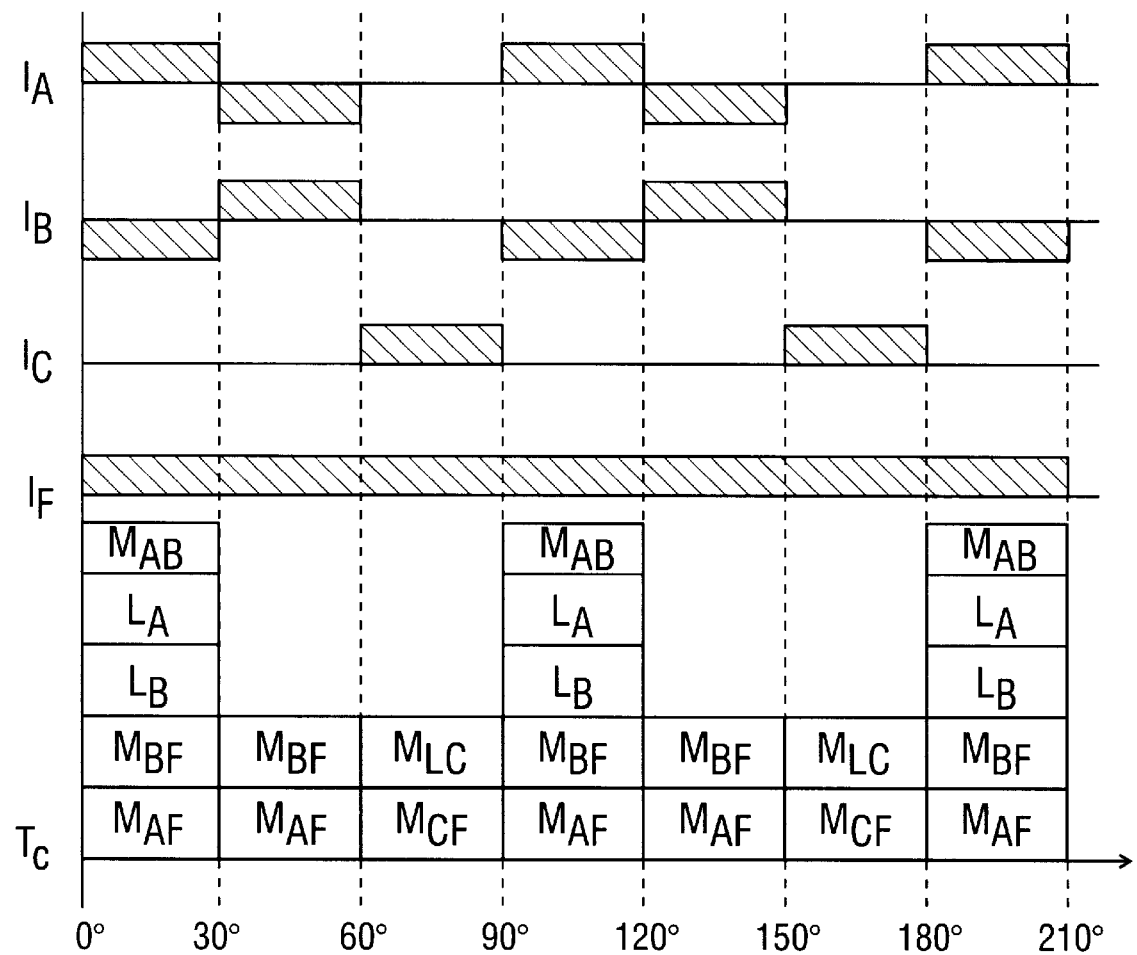
Figure 13C:
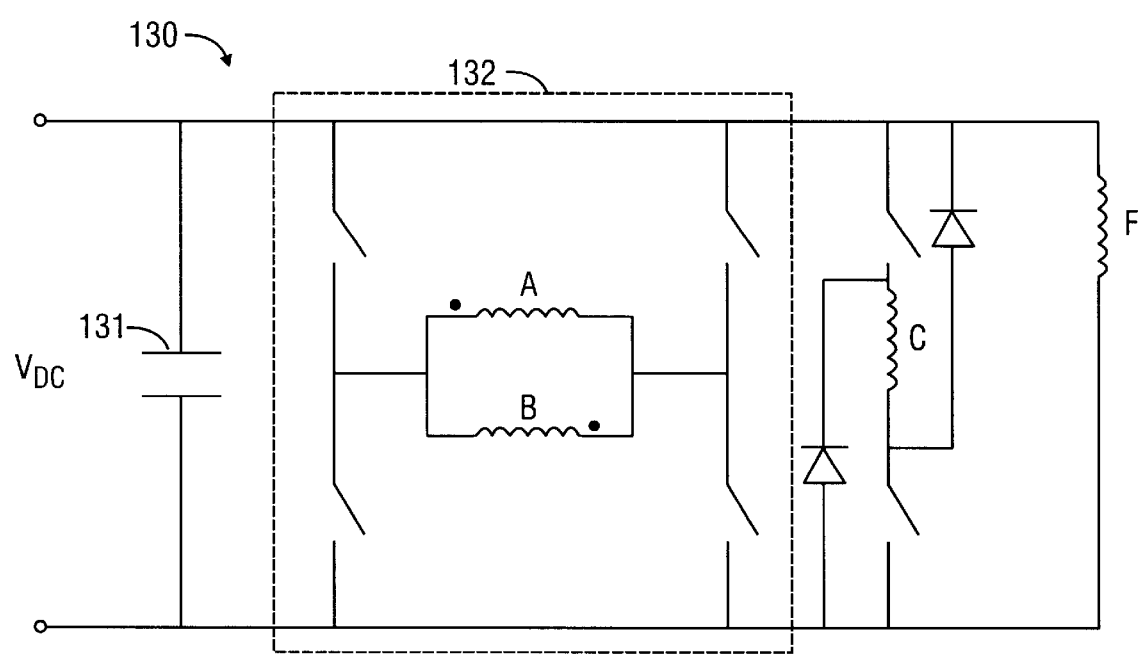

Because overlapping currents are utilized in the energization scheme of FIGS. 13A–13C it is possible to produce more torque as a function of the chances in the mutual-inductances between the various phase windings. Thus, the total torque output for the machine 90 of FIG. 9, T, when energized with overlapping currents, may be generally expressed as:

$$T = \frac{1}{2} I_A^2 \frac{\partial L_A}{\partial \theta} + \frac{1}{2} I_B^2 \frac{\partial L_B}{\partial \theta} + \frac{1}{2} I_C^2 \frac{\partial L_C}{\partial \theta} + I_A I_F \frac{\partial M_{AF}}{\partial \theta} +$$

$$I_B I_F \frac{\partial M_{BF}}{\partial \theta} + I_C I_F \frac{\partial M_{CF}}{\partial \theta} + I_A I_B \frac{\partial M_{AB}}{\partial \theta}$$

FIG. 13B illustrates an exemplary energization scheme utilizing overlapping bi-polar currents to produce positive output torque in a desired direction. According to the illustrated energization scheme: (i) the phase A winding is energized with positive current during the intervals of rotor rotation over which the self-inductance of the phase A winding is increasing (e.g., the 0°–30°, 90°–120° and 180°–210° intervals); (ii) the phase B winding is energized with negative current during the intervals of rotor rotation over which the self-inductance of the phase B winding is increasing (e.g., the 0°–30°, 90°–120° and 180°–210° intervals); (iii) the phase C winding is energized with positive current during the intervals of rotor rotation over which the self-inductance of the phase C winding is increasing (e.g., the 60°–90° and 150°–180° intervals); (iv) the phase A winding is energized with negative current during the intervals of rotor rotation over which the mutual-inductance between the phase A winding and the auxiliary field winding F is decreasing (e.g., the 30–60 and 120–150 degree intervals); and (v) the phase B winding is energized with positive current during the intervals of rotor rotation over which the mutual-inductance between the phase B winding and the auxiliary field winding F is increasing (e.g., the 30–60 and 120–150 degree intervals).

As reflected in the waveform illustrated in FIG. 13B, the total net torque output is positive and greater than that available from conventional machines.

The energization scheme of FIG. 13A–13B may be implemented though the use of a power converter similar to that previously described in connection with FIG. 6. Further, because the current excitations provided to the phase A winding in he energization scheme of FIG. 13B are the inverse of the current excitations provided to the phase B winding, a less complicated power converter may be used. One example of such a power converter is illustrated in FIG. 13C.

FIG. 13C illustrates a novel power converter 130 that includes a DC bus (+ and −) across which is coupled a DC bus capacitor 131. DC power may be applied to the DC bus from a battery, an AC-DC converter, or other suitable power source. Coupled across the DC bus is a first grouping of power switching devices 132 (such as MOSFETS or IGBTS) that are arranged in an H-bridge configuration. In the example of the FIG. 13C, the phase A and phase B windings are coupled in parallel across the H-bridge such that by appropriate actuation of alternate opposing pairs of switching devices bi-polar current may be established in the parallel connection of the phase A and phase B windings. As reflected by the + and − designations on the phase A and phase B windings the phase A and B windings are configured such that when positive current flows in the phase A winding (e.g., current from + to −) negative current (e.g., current from − to +) flows in the phase B winding. The switching pattern for the group of power switching devices 132 to implement the energization scheme of FIG. 13B will be apparent to those of ordinary skill in the art having the benefit of this disclosure.

In the power converter of FIG. 13C the phase C winding is coupled to the DC bus via upper and lower power switching devices and upper and lower flyback diodes to allow for the controlled establishment of uni-polar current in the phase C winding. The operation of the energization circuitry for the phase C winding is conventional and will be understood by those of ordinary skill in the art having the benefit of this disclosure.

In the embodiment of FIG. 13C the auxiliary field winding F is coupled directly across the DC bus. It will be appreciated that a power switching device can be coupled in series with the auxiliary field winding F such that the current in the auxiliary field winding F can be controlled.

Figure 14:
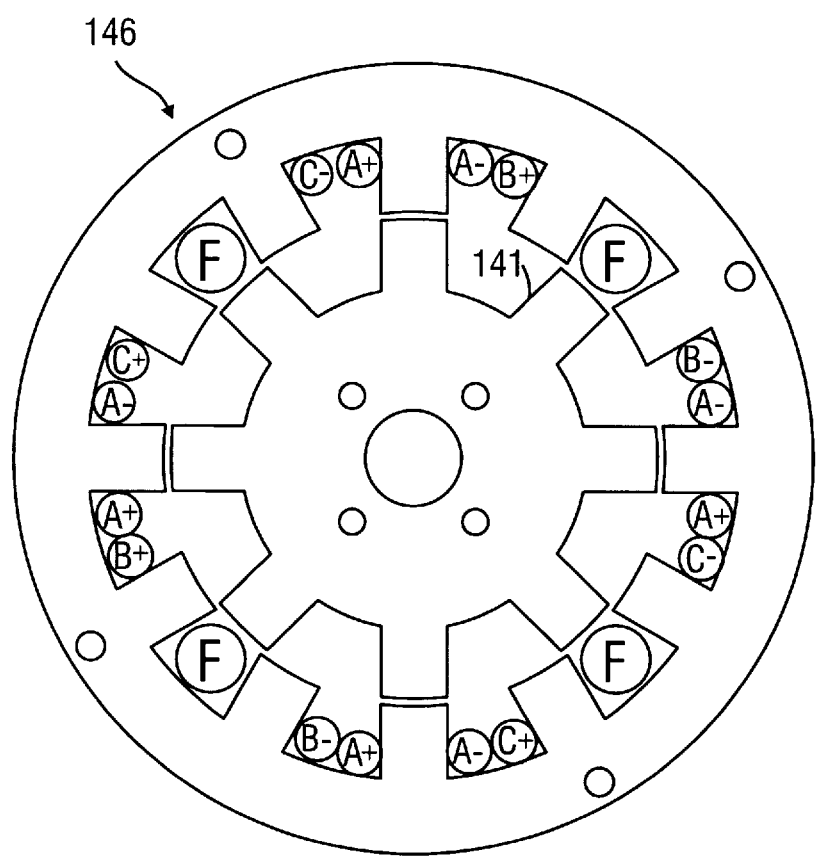
FIG. 14 illustrates an eight rotor pole, twelve stator pole machine constructed according to the teaching of the present invention utilizing conventional stator laminations.

Those of ordinary skill in the art will appreciate that the exemplary machine 90 of FIG. 9 is but one example of how the novel winding arrangement of the present invention may be used to construct a reluctance machine that has an auxiliary field winding according to the present invention and that is constructed using conventional stator lamination. Alternate constructions, using differing number of rotor poles and stator poles and having auxiliary field windings of multi-coil construction are envisioned. FIG. 14 illustrates one such exemplary embodiment.

FIG. 14 illustrates a reluctance machine 140 including a eight pole rotor 141 and a twelve pole stator 142. Positioned within the rotor are three phase windings A, B and C and an auxiliary field winding F. The phase A winding a short-pitched winding comprising four short pitched coil that are coupled together in series or parallel to form a single phase winding. Each of the phase B and C windings is a fractional-pitched winding and, in the example of FIG. 14, each of the phase A and B windings comprise two coils. The energization schemes of FIGS. 12 and 13B, as well as other energization schemes, may be used to control the machine 140.

The above description of several exemplary embodiments is made by way of example and not for purposes of limitation. Many variations may be made to the embodiments and methods disclosed herein without departing from the scope and spirit of the present invention. The present invention is intended to be limited only by the scope and spirit of the following claims.

I claim as my invention:

1. A reluctance machine comprising:
   a stator defining a plurality of stator poles;
   a rotor defining a plurality of rotor poles, the rotor positioned to rotate relative to the stator;
   a first phase winding positioned within the stator, the first phase winding comprising at least one short-pitched winding coil;
   a second phase winding positioned within the stator, the second phase winding comprising at least one factional-pitched coil; and
   a fully-pitched auxiliary winding positioned within the stator.

2. The reluctance machine of claim 1 wherein the stator defines a plurality of stator slots and the short-pitched winding coil and the fractional-pitched winding coil each include a first section positioned within one stator slot and a second section positioned within another stator slot, wherein one of the sections of the short-pitched winding coil and one of the sections of the fractional-pitched winding coil share a common stator slot.

3. The reluctance machine of claim 1 wherein the total number of ampere-turns for the first phase winding is substantially equal to the total number of ampere-turns of the second phase winding.

4. The reluctance machine of claim 1 wherein the first phase winding defines N short-pitched winding coils, N being an integer greater than 1, and wherein the second phase winding comprises N/2 fractional-pitched winding coils.

5. The reluctance machine of claim 1 wherein the stator define eight stator poles and the rotor defined four rotor poles.

6. The reluctance machine of claim 1 wherein the stator defines a plurality of substantially identical stator slots, wherein the auxiliary field winding comprises at least one winding coil that essentially fills two of the stator slots, wherein the short-pitched winding coil and the fractional pitched winding coil each include a first section positioned within one stator slot and a second section, positioned within another stator slot, and wherein one of the sections of the short pitched winding coil shares a slot with one of the sections of the fractional-pitched winding coil.

7. A stator for a reluctance machine comprising:
   a stack of stator laminations defining a plurality of stator poles and inter-pole slots;
   a short-pitched phase winding positioned about a first set of stator poles, the short-pitched winding comprising at least two short-pitched coils wherein a first section of each short-pitched coil is positioned within one inter-pole slot and a second section of each short-pitched coil is positioned within another inter-pole slot,
   a plurality of fractional-pitched phase windings, each fractional-pitched phase winding being positioned about a set of stator poles, each fractional-pitched phase winding comprising at least one fractional-pitched coil wherein a first section of each fractional-pitched coil is positioned within one inter-pole slot and a second section of each fractional-pitched coil is positioned within another inter-pole slot; and
   an auxiliary field winding positioned within the stator, the auxiliary field winding comprising at least one winding coil;
   wherein one of the sections from each short-pitched coil from the short-pitched phase winding shares one of the inter-pole slots with one of the sections of at least one fractional-pitched coil from a fractional-pitched phase winding, such that the number of stator slots shared by the short-pitched and the fractional-pitched coils is less than the total number of stator slots, and wherein the at least one winding coil from the auxiliary field winding does not share slots with any of the short-pitched or fractional-pitched coils.

8. The stator of claim 7 wherein the all of the inter-pole slots have substantially the same dimensions.

9. The stator of claim 7 wherein the stator is an N phase stator, N being an integer greater than 1, wherein each short-pitched winding coil surrounds a single stator pole, each fractional-pitched winding surrounds N–1 stator poles, and wherein the at least one winding coil from the auxiliary field winding surrounds N stator poles.

10. The stator of claim 9 wherein the stator is a three-phase stator, the stator defines twelve stator poles, and wherein the auxiliary field winding comprises two winding coils, each surrounding three stator poles.

11. The stator of claim 7 wherein the auxiliary field winding is a fully-pitched winding.

12. The stator of claim 7 wherein the stator is formed from a stack of substantially round stator laminations.

13. A reluctance machine system comprising:
   a reluctance machine including a rotor and a stator;
   first and second fractional-pitched phase windings positioned within the stator, wherein the first and second fractional-pitched phase windings are electrically coupled in parallel;
   a short pitched phase winding positioned within the stators;
   a fully-pitched auxiliary field winding positioned within the stator; and
   a power converter adapted to provide continuous energizing current to the fully-pitched auxiliary field winding and further adapted to provide energizing currents to the parallel connection of the first and second fractional-pitched phase windings and to the short-pitched phase winding in response to electrical signals indicative of the position of the rotor relative to the stator.

14. The reluctance machine system of claim 13 wherein both the first and the second fractional-pitched phase windings each comprise at least one fractional-pitched winding coil.

15. The reluctance machine of claim 13 wherein the power converter comprises a DC bus and wherein the auxiliary field winding is coupled directly across the DC bus.

16. The reluctance machine system of claim 13 wherein the power converter comprises a DC bus and wherein the parallel connection of the first and second fractional-pitched phase windings is coupled across the DC bus by a H-bridge switching arrangement.

17. A reluctance machine comprising:
   a stator defining a plurality of stator-poles and inter-pole stator slots, each of the stator slots having substantially the same dimensions;
   a rotor defining a plurality of rotor poles, the rotor being positioned to rotate relative to the stator;
   a plurality of phase windings positioned within the stator, the plurality of phase windings filling less than all of the inter-pole stator slots; and
   means for providing auxiliary field excitations positioned within a plurality of inter-pole stator slots not filled by the plurality of phase windings.

* * * * *